May 26, 1953   D. H. REEVES   2,639,860
PARTIAL PRODUCT MACHINE
Filed Oct. 25, 1947   19 Sheets-Sheet 1

INVENTOR.
Donald H. Reeves
BY Dybvig & Dybvig
His Attorneys

May 26, 1953  D. H. REEVES  2,639,860
PARTIAL PRODUCT MACHINE
Filed Oct. 25, 1947  19 Sheets-Sheet 2

Fig. 3

INVENTOR.
BY Donald H. Reeves
Dybvig & Dybvig
His Attorneys.

May 26, 1953 D. H. REEVES 2,639,860
PARTIAL PRODUCT MACHINE
Filed Oct. 25, 1947 19 Sheets-Sheet 5
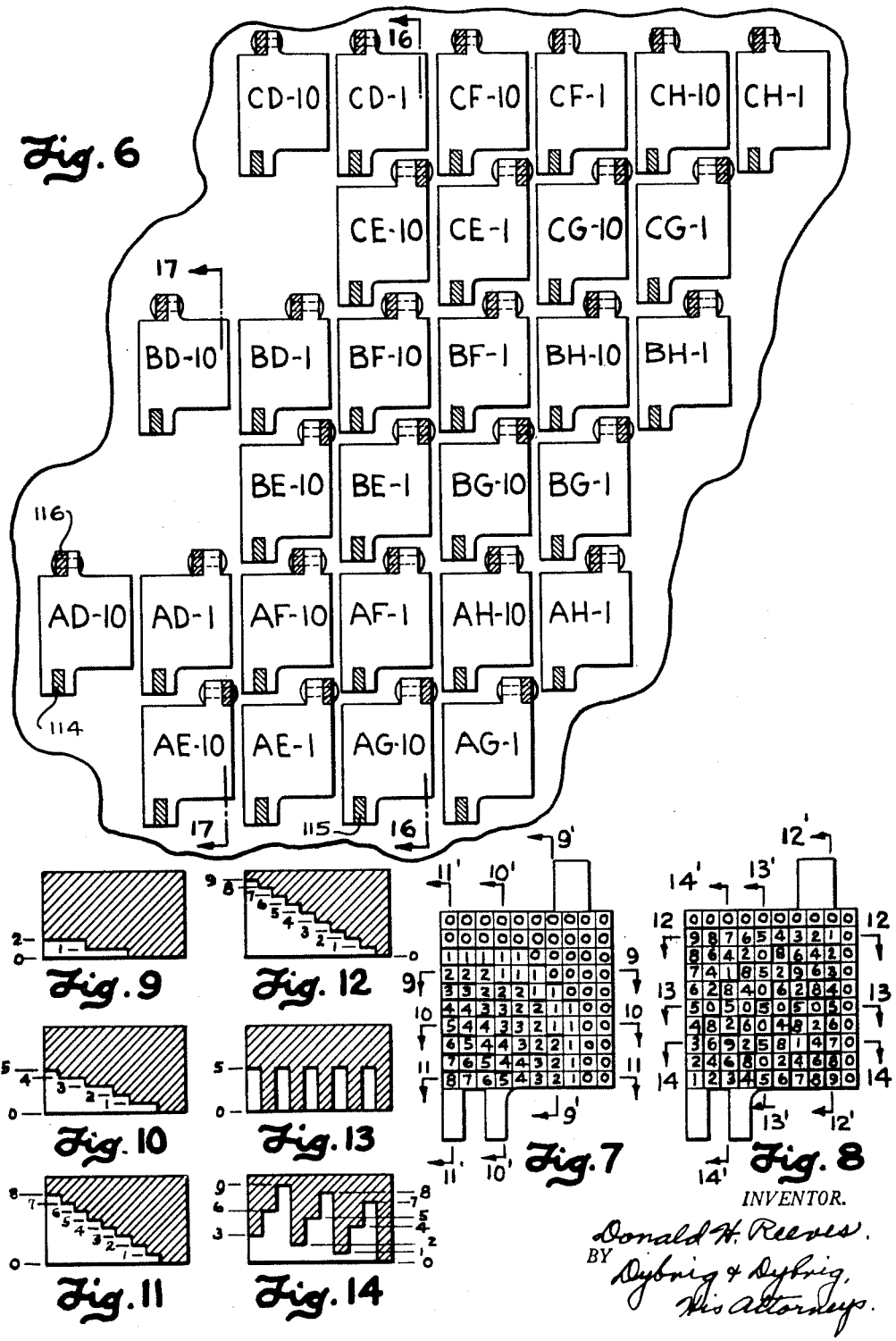

May 26, 1953  D. H. REEVES  2,639,860
PARTIAL PRODUCT MACHINE
Filed Oct. 25, 1947  19 Sheets-Sheet 11
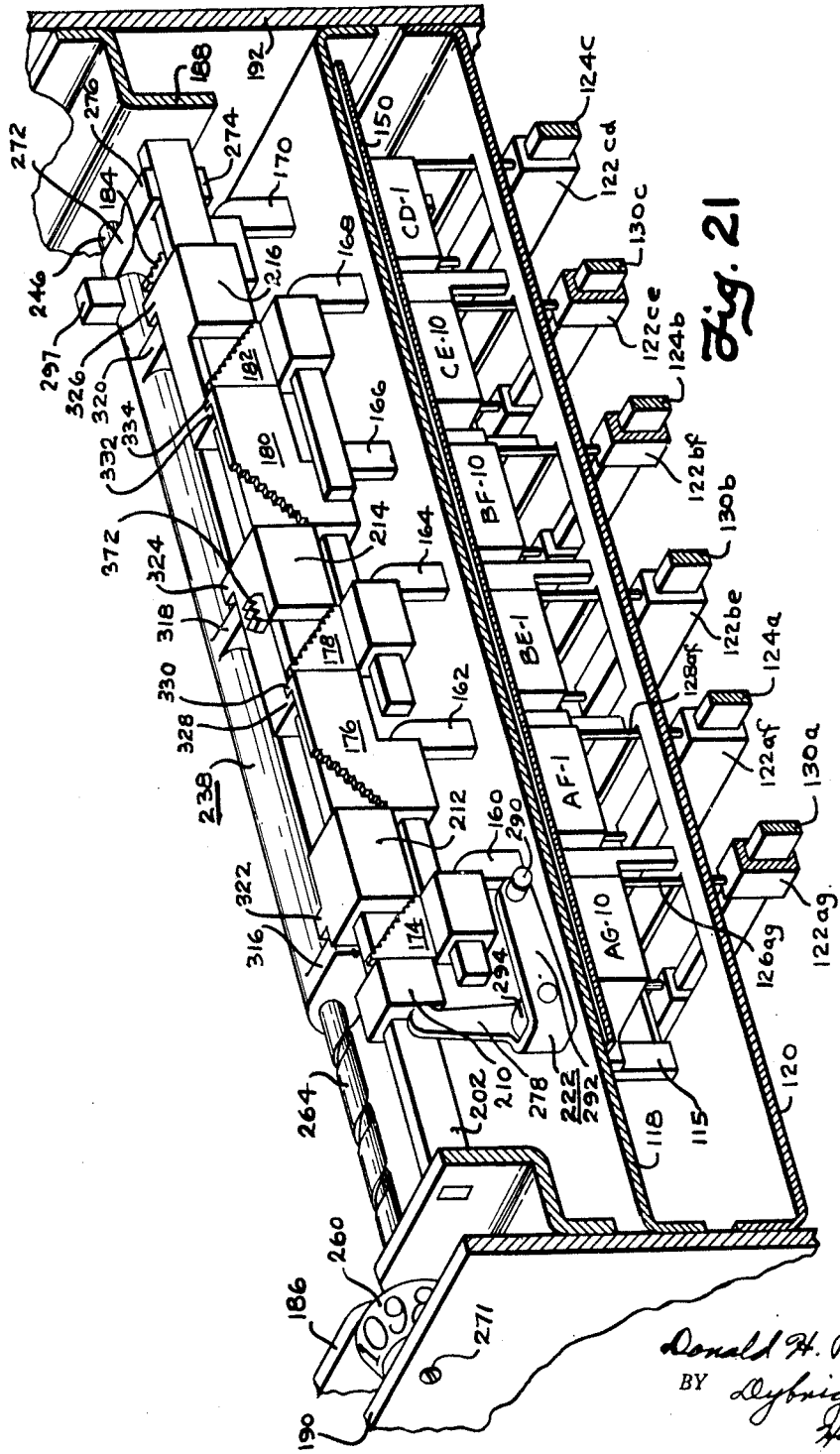
INVENTOR.
Donald H. Reeves.
BY Dybvig & Dybvig
His Attorney.

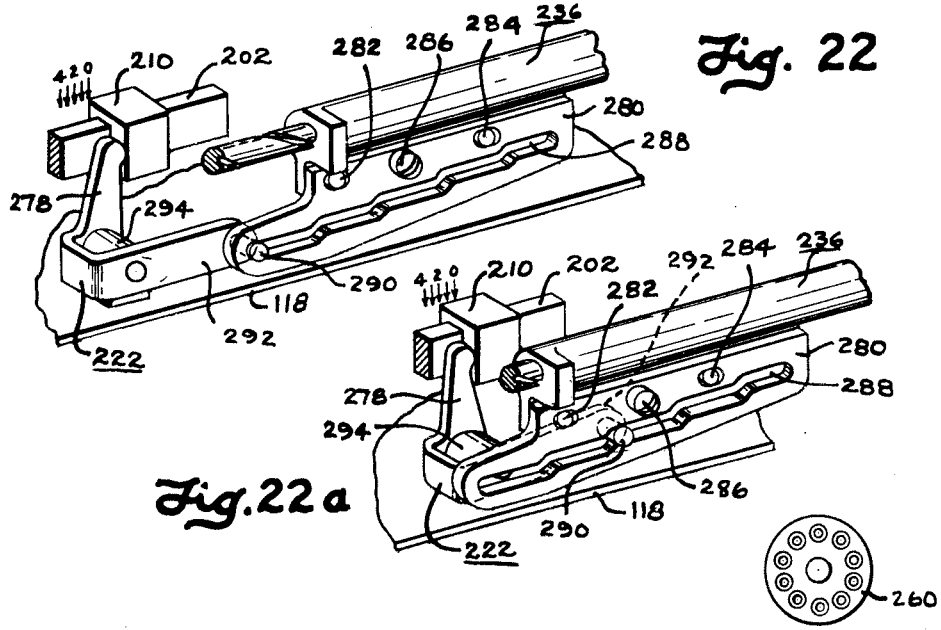
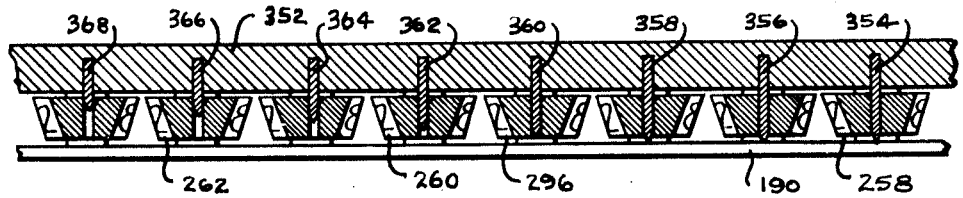
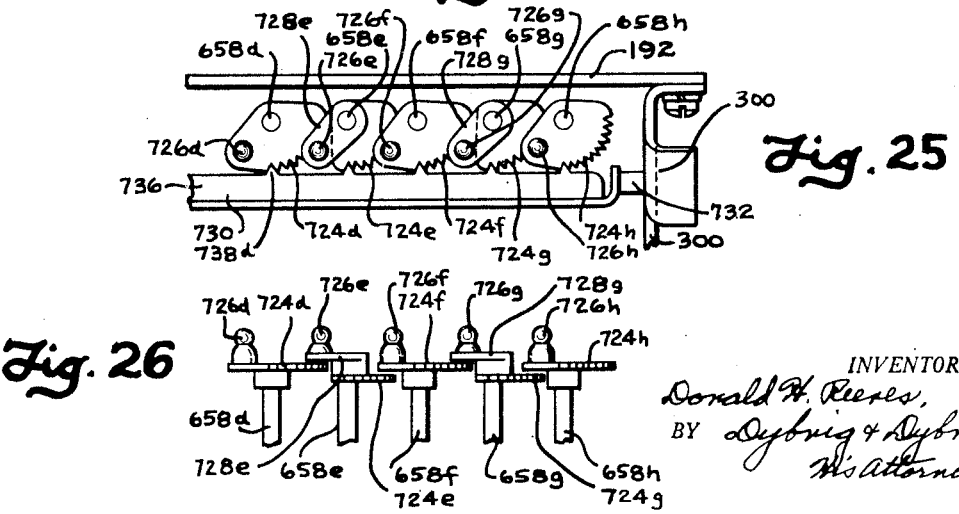

May 26, 1953
D. H. REEVES
2,639,860
PARTIAL PRODUCT MACHINE
Filed Oct. 25, 1947
19 Sheets-Sheet 13
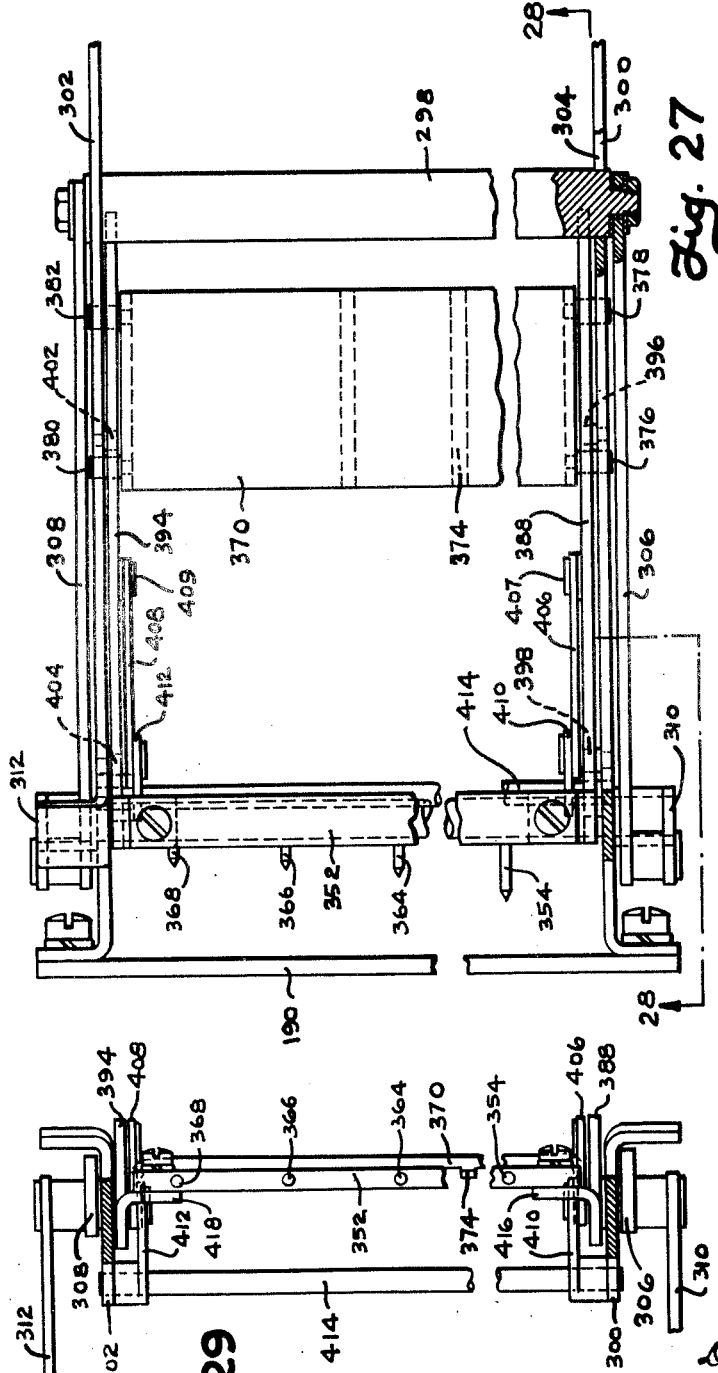
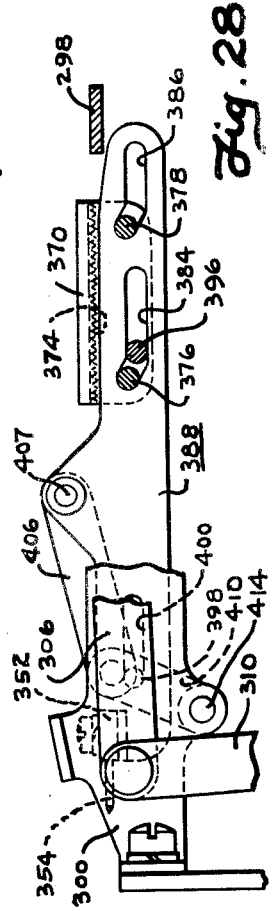
INVENTOR.
Donald H. Reeves,
BY Dybvig & Dybvig.
His attorneys.

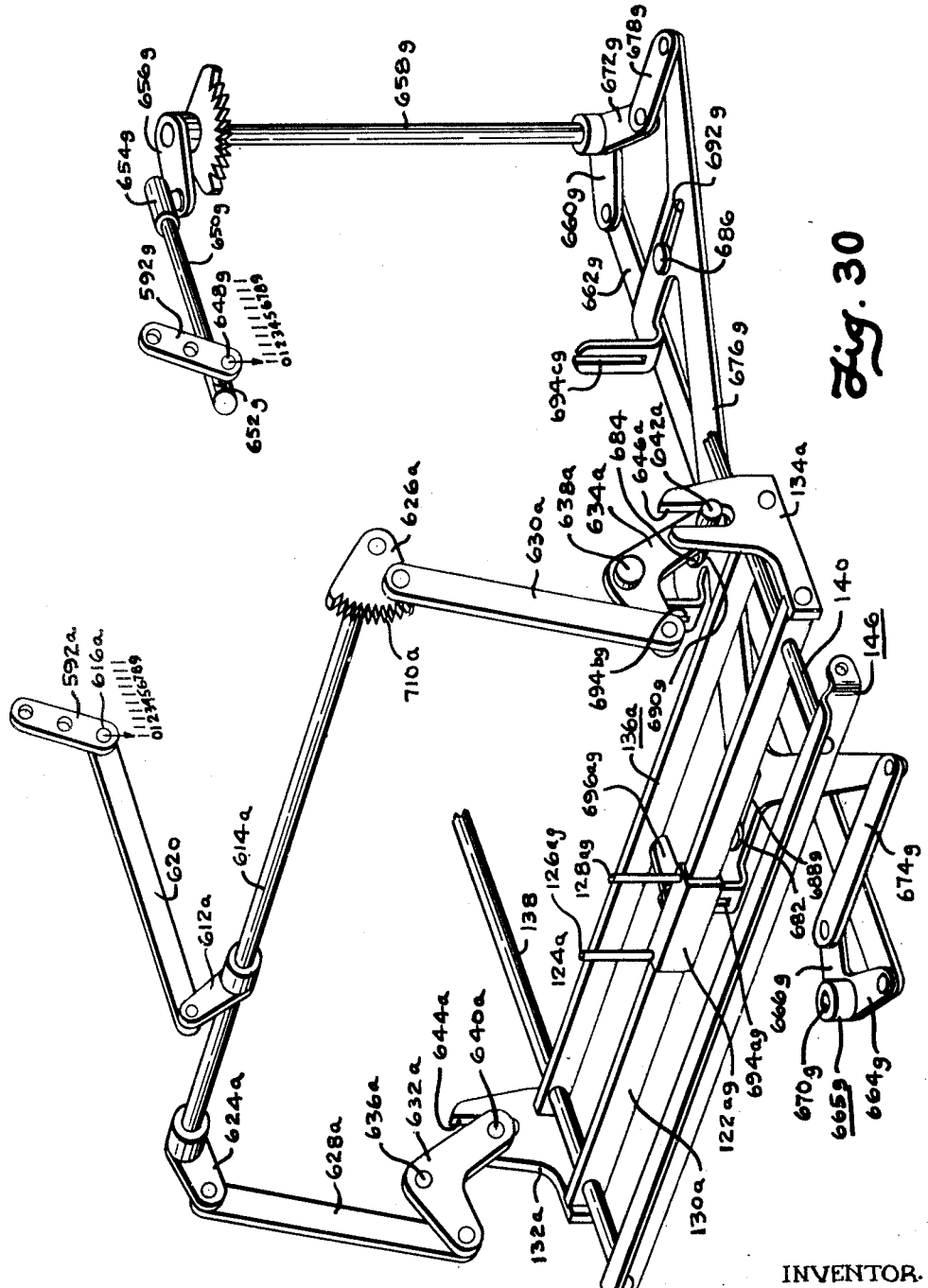

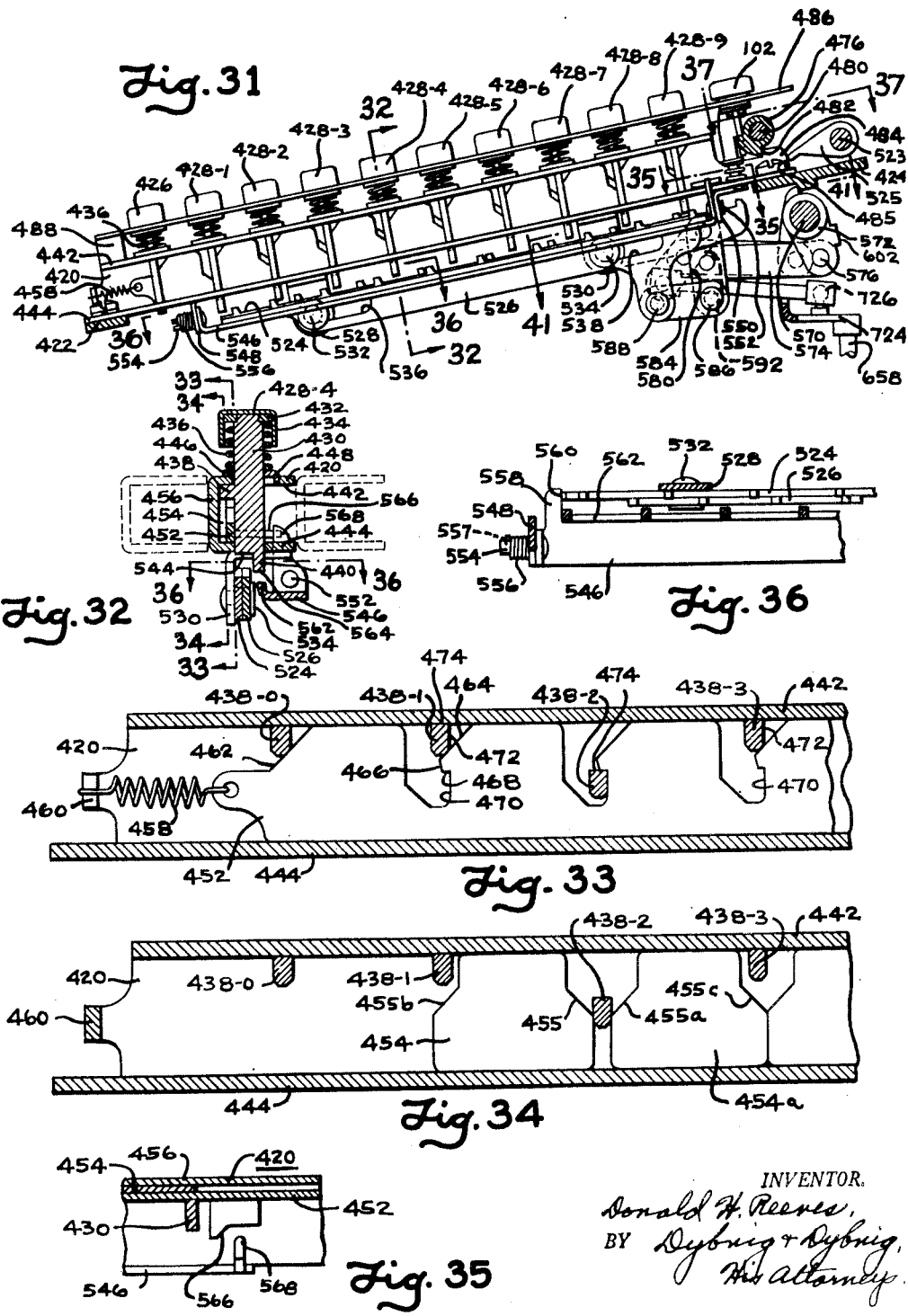

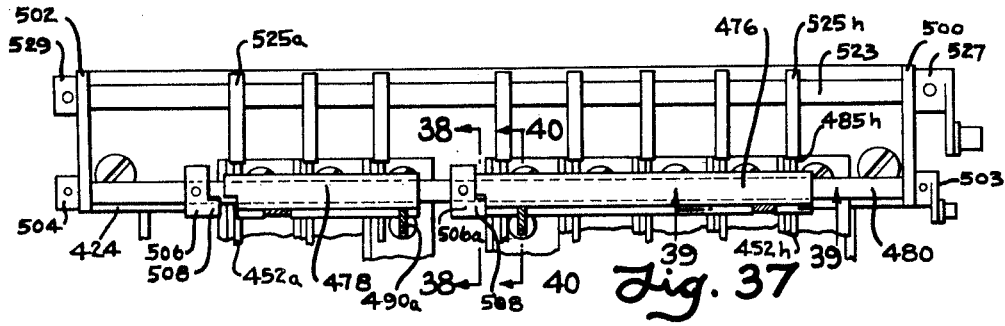
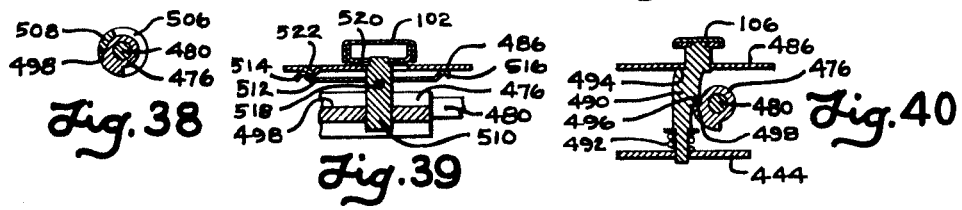
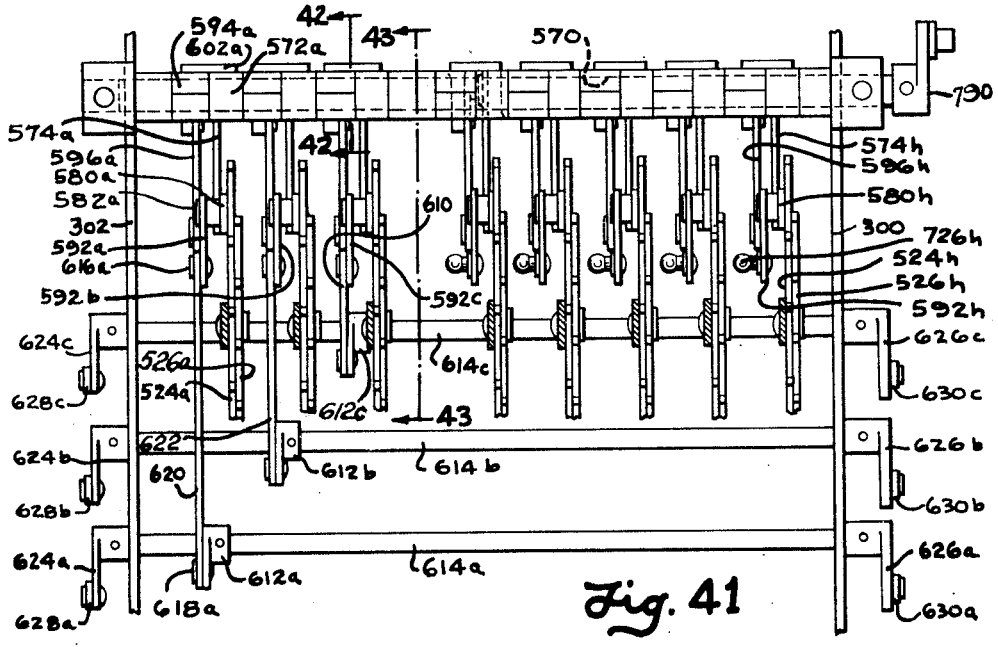
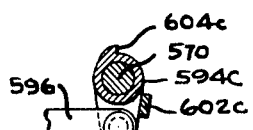

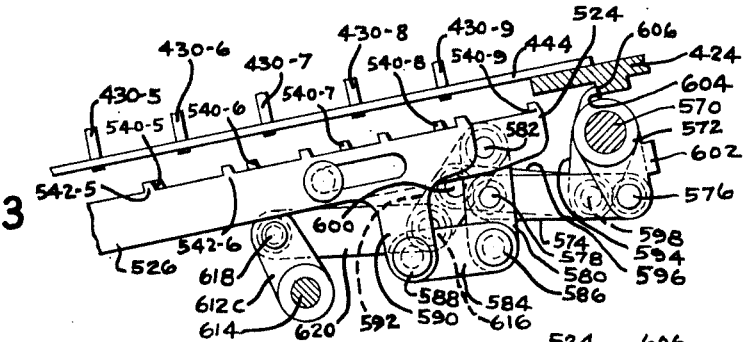
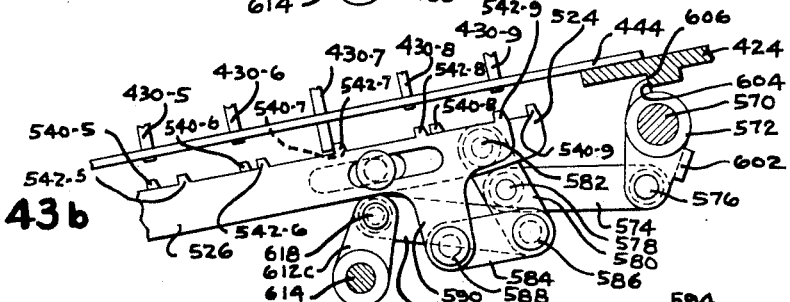
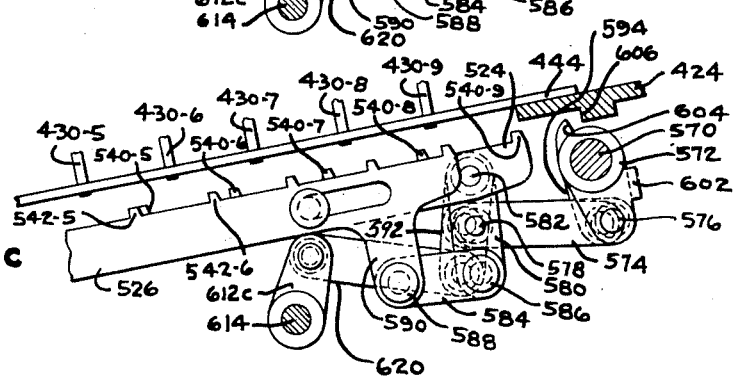

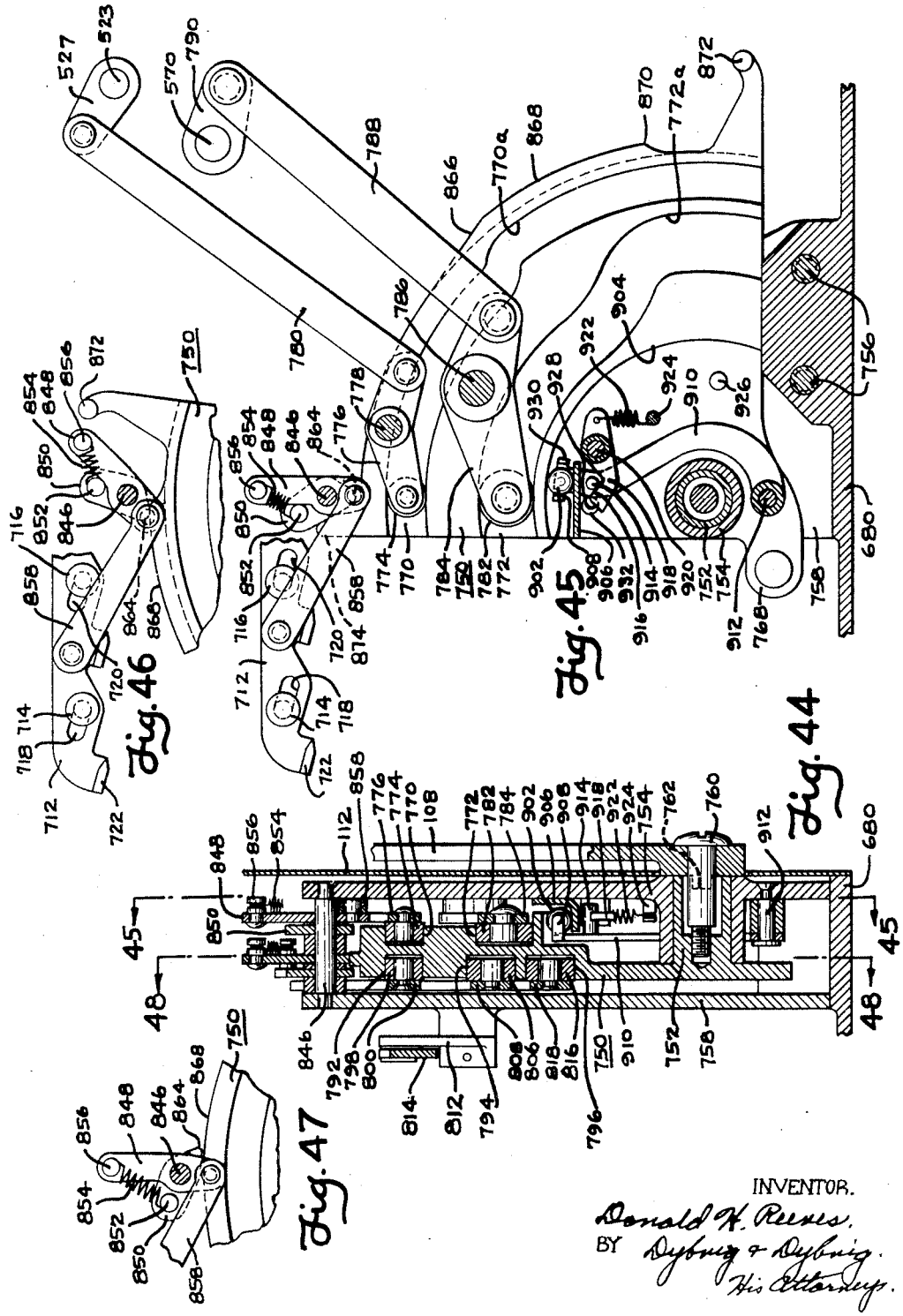

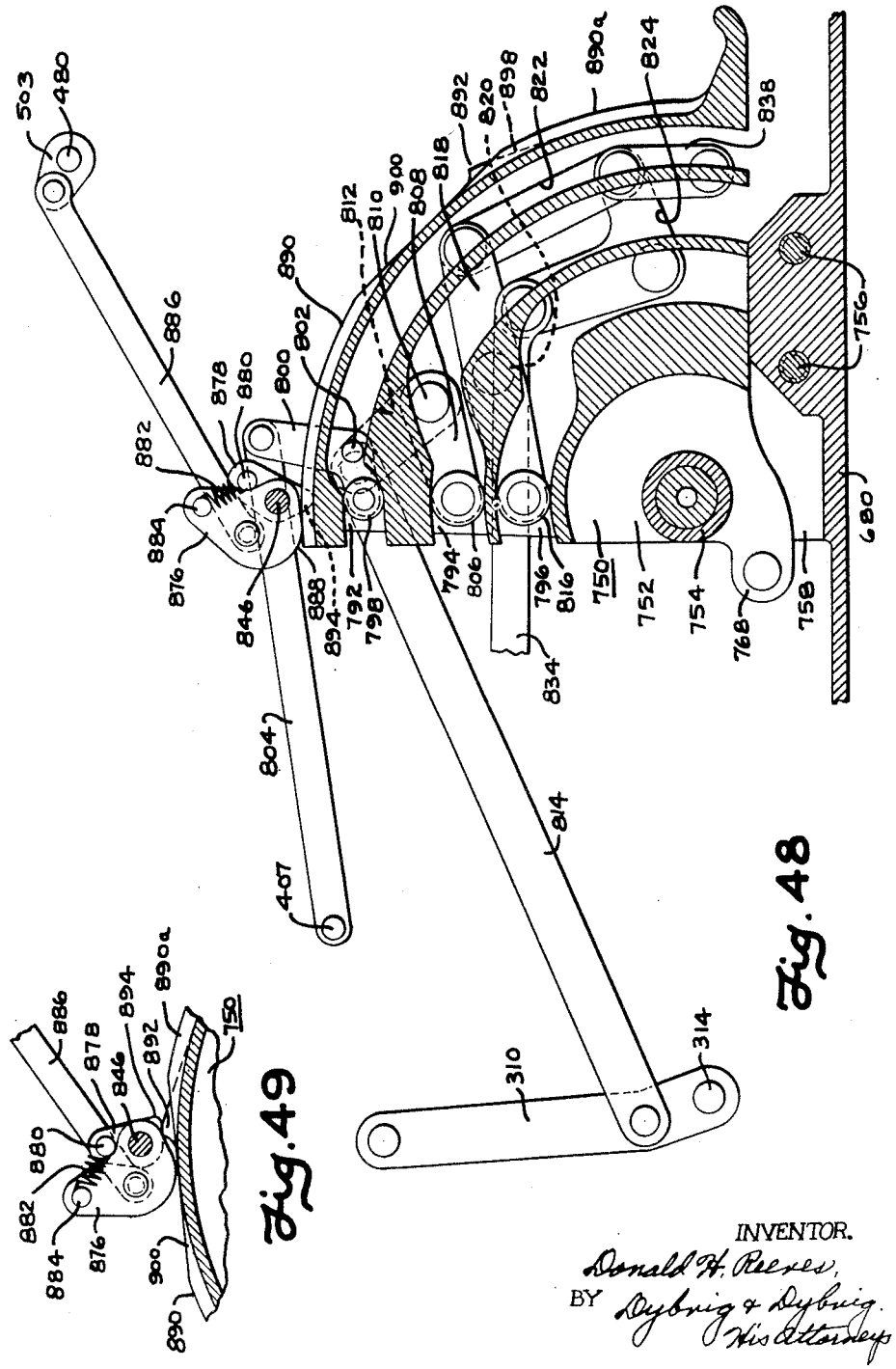

Patented May 26, 1953

2,639,860

UNITED STATES PATENT OFFICE 2,639,860

PARTIAL PRODUCT MACHINE

Donald H. Reeves, Beulah, Mich.

Application October 25, 1947, Serial No. 782,139

9 Claims. (Cl. 235—61)

This invention relates to a computing machine and more particularly to a computing machine for the purpose of multiplying.

In the past, computing machines of the types in common use have been so constructed that multiplication is accomplished by adding the amount to be multiplied a number of times, the number depending upon the value of the multiplier, thereby requiring several operations of the machine in order to obtain one complete computation and averaging five operations of the machine for each digit in the multiplier. Thus, a three digit multiplier averages fifteen operations and may go as high as twenty-seven. While such machines have been developed to a point where the operations are quite rapid, yet multiplication by this method is somewhat slower than would be the case with a machine that is so made as to multiply any two given numbers in a single operation of the machine.

While numerous patents have been issued on machines that multiply by what is known as the "partial product" method, rather than by the "repeated addition" method, these machines have been extremely complicated and necessarily of such size and weight as to greatly reduce their practicability, at the same time greatly increasing their cost. In the designs used for some of these machines, it is still necessary to perform several operations of the machine in order to complete one computation, although the number of operations is less than in the case of repeated addition. These disadvantages have greatly limited the desirability of these machines and, as a result, very few "partial product" machines are in actual use.

An object of this invention is to improve computing machines. More specifically, an object of this invention is to provide a machine which will so operate as to require only one operation in order to complete the multiplication of any two given numbers and in which that single operation will require an extremely short period of time.

Another object of this invention is to provide a computing machine of the type described which indicates the amount of the result of the computation at the end of its operation, but does not require a separate operation of the machine or on the part of the operator in order to clear the machine of the previous computation, or, in other words, to reset the mechanism to zero, before a new computation can be made; instead, in my invention the mechanism is automatically cleared at the beginning of each operation, thereby further reducing the number of operations of the machine or of the operator that are required for a complete computation.

Another object of this invention is to provide a computing machine of the type described in which the amount keys that must be depressed by the operator are not required to move any part of the computing mechanism, resulting in extremely easy and fast key operation.

Another object of this invention is to provide a computing machine of the type described which will be so light in weight and so small in size as to be easily moved from one place to another. The small size will also make it practical to use this machine on a desk, in the same manner as portable adding and computing machines are now used.

Another object of this invention is to provide a computing machine of the type described that is so designed as to require less parts than is the case in previous designs and which can be constructed at a lower cost.

Another object of this invention is to provide a machine of the type described which is so designed that as many as possible of the necessary steps which are required for the completion of the computation are performed simultaneously in order to reduce the number of successive operations and consequently reduce the total time necessary for the completion of the computation.

Another object of this invention is to provide a computing machine of the type described which will have extreme flexibility of operation, so that in case the same multiplicand or the same multiplier is to be used in successive operations of the machine, the completion of each operation of the machine can be made to release the keys for either the multiplicand or the multiplier, as designed, while the keys for the other remain depressed. Likewise, if an error is made in depressing the keys for either the multiplicand or the multiplier, the keys for either one can be released without releasing the keys for the other.

Another object of this invention is to provide a basic multiplying mechanism which can be used in connection with adding and/or subtracting mechanism, printing mechanism, typewriting mechanism, et cetera, for producing more complete machines for various types of work requiring such machines.

Other objects and advantages reside in the construction of parts, the combination thereof and the mode of operation, as will become more apparent from the following description.

FUNDAMENTAL PRINCIPLES INVOLVED

In multiplication, as ordinarily performed mentally, the record of the multiplication of two numbers, such as 76584 multiplied by 277, appears as follows:

*Example I*

```
        7 6 5 8 4
            2 7 7
        ─────────
        5 3 6 0 8 8
      5 3 6 0 8 8
    1 5 3 1 6 8
    ─────────────
    2 1 2 1 3 7 6 8
```

Another method by which the multiplication can be accomplished mentally would show a record as follows:

*Example II*

```
            7 6 5 8 4
                2 7 7
            ─────────
                  2 8
                5 6
              3 5
            4 2
          4 9
                  2 8
                5 6
              3 5
            4 2
          4 9
                0 8
              1 6
            1 0
          1 2
        1 4
        ─────────────
        2 1 2 1 3 7 6 8
```

It will be noticed that in the above computation, each individual digit of the multiplicand has been separately multiplied by each digit of the multiplier and each of these products has been recorded separately in such positions that, when the columns are added, the correct product of the entire multiplicand and the entire multiplier is obtained. This type of multiplication employs the basic principles of the type of multiplication known as "partial product" multiplication. It will be noted that each partial product consists of two digits, although one of these digits may be zero. The above partial product multiplication can be arranged, as far as the record of the multiplication is concerned, as follows:

*Example III*

```
            7 6 5 8 4
                2 7 7
            ─────────
          4 9—3 5—2 8
            4 2—5 6
        4 9—3 5—2 8
          4 2—5 6
      1 4—1 0—0 8
        1 2—1 6
      ─────────────
      2 1 2 1 3 7 6 8
```

In the above, the dash (—) indicates separation of the various partial products. The above arrangement requires less space to record the partial product multiplication than was the case with the first partial product example shown.

This second arrangement is shown because it is the basis of the arrangement of some of the parts used in my multiplying machine.

From an observation of Examples I, II and III, it can readily be seen that the product of two digits, both of which are in the units place, results in a product having one digit in the units place and one digit in the tens place. The digit in the tens place may, of course, be zero. Furthermore, it is clearly seen from the examples that the product obtained by multiplying two digits together, one of which is found in the units place and the other in the tens place, results in a product having one digit in the tens place and one digit in the hundreds place. The product of two digits, one of which is in the units place and the other in the tens place, results in a product have one digit in the tens place and one in the hundreds place. If two numbers are used, each having two or more digits, the partial products will consist of two products, each having one digit in the tens place and one digit in the hundreds place.

This may be further exemplified mathematically by referring to the digits in the various places as represented by a digit multiplied by 10 raised to a predetermined power, depending upon the place of the digit. For example, the digits in the units place may be represented by the digit times $(10)^0$. Digits in the tens place may be referred to as a digit times $(10)^1$. Digits in the hundreds place may be referred to as a digit times $(10)^2$. When it comes to the products of two digits expressed in terms of the digit times 10 raised to a power, the places of the product may be represented by a product times 10 raised to a power depending upon the power of 10 in the multiplier and to the power of 10 in the multiplicand, as is well known to a mathematician.

In my invention, one portion of the mechanism performs the multiplication of the various partial products, or the multiplication of each digit of the multiplicand by each digit of the multiplier. This portion of the mechanism will hereafter be called the "digit multiplier." A second portion of the mechanism adds the proper numbers together to arrive at the final product. All of the partial products are computed simultaneously, after which all of the partial products are added simultaneously.

The "digit multiplier" used in my invention is in reality a mechanical adaptation of the multiplication table of numbers from 0 to 9, which, in ordinary form, appear as follows, each product being shown as a two-digit number:

*Table I*

| Multiplicand | | | | | | | | | | Multiplier |
|---|---|---|---|---|---|---|---|---|---|---|
| 9 | 8 | 7 | 6 | 5 | 4 | 3 | 2 | 1 | 0 | |
| 00 | 00 | 00 | 00 | 00 | 00 | 00 | 00 | 00 | 00 | 0 |
| 09 | 08 | 07 | 06 | 05 | 04 | 03 | 02 | 01 | 00 | 1 |
| 18 | 16 | 14 | 12 | 10 | 08 | 06 | 04 | 02 | 00 | 2 |
| 27 | 24 | 21 | 18 | 15 | 12 | 09 | 06 | 03 | 00 | 3 |
| 36 | 32 | 28 | 24 | 20 | 16 | 12 | 08 | 04 | 00 | 4 |
| 45 | 40 | 35 | 30 | 25 | 20 | 15 | 10 | 05 | 00 | 5 |
| 54 | 48 | 42 | 36 | 30 | 24 | 18 | 12 | 06 | 00 | 6 |
| 63 | 56 | 49 | 42 | 35 | 28 | 21 | 14 | 07 | 00 | 7 |
| 72 | 64 | 56 | 48 | 40 | 32 | 24 | 16 | 08 | 00 | 8 |
| 81 | 72 | 63 | 54 | 45 | 36 | 27 | 18 | 09 | 00 | 9 |

In order to adapt the above table to the "digit multiplier" that is used in my invention, it is rearranged into two tables, one of the "ten"

digits, or 10's, and one of the "unit" digits, or 1's, as follows:

*Table II*

| 10's Multiplicand | | | | | | | | | | Multiplier | 1's Multiplicand | | | | | | | | | |
|---|---|---|---|---|---|---|---|---|---|---|---|---|---|---|---|---|---|---|---|---|
| 9 | 8 | 7 | 6 | 5 | 4 | 3 | 2 | 1 | 0 | | 9 | 8 | 7 | 6 | 5 | 4 | 3 | 2 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 9 | 8 | 7 | 6 | 5 | 4 | 3 | 2 | 1 | 0 |
| 1 | 1 | 1 | 1 | 1 | 0 | 0 | 0 | 0 | 0 | 2 | 8 | 6 | 4 | 2 | 0 | 8 | 6 | 4 | 2 | 0 |
| 2 | 2 | 2 | 1 | 1 | 1 | 0 | 0 | 0 | 0 | 3 | 7 | 4 | 1 | 8 | 5 | 2 | 9 | 6 | 3 | 0 |
| 3 | 3 | 2 | 2 | 2 | 1 | 1 | 0 | 0 | 0 | 4 | 6 | 2 | 8 | 4 | 0 | 6 | 2 | 8 | 4 | 0 |
| 4 | 4 | 3 | 3 | 2 | 2 | 1 | 1 | 0 | 0 | 5 | 5 | 0 | 5 | 0 | 5 | 0 | 5 | 0 | 5 | 0 |
| 5 | 4 | 4 | 3 | 3 | 2 | 2 | 1 | 0 | 0 | 6 | 4 | 8 | 2 | 6 | 0 | 4 | 8 | 2 | 6 | 0 |
| 6 | 5 | 4 | 4 | 3 | 2 | 2 | 1 | 0 | 0 | 7 | 3 | 6 | 9 | 2 | 5 | 8 | 1 | 4 | 7 | 0 |
| 7 | 6 | 5 | 4 | 4 | 3 | 2 | 1 | 0 | 0 | 8 | 2 | 4 | 6 | 8 | 0 | 2 | 4 | 6 | 8 | 0 |
| 8 | 7 | 6 | 5 | 4 | 3 | 2 | 1 | 0 | 0 | 9 | 1 | 2 | 3 | 4 | 5 | 6 | 7 | 8 | 9 | 0 |

With the numbers uniformly spaced in each direction, as they are in the tables above, if an indicator is used with two indicating points on the same horizontal line and of the proper distance apart to indicate simultaneously the "0" column or tier in the 10's section and the "0" column or tier in the 1's section, then, as this indicator is moved horizontally into the correct columns for the multiplicand and vertically into the correct row for the multiplier, the two indicating points will indicate the product. Thus, if the indicator is moved horizontally into the "9" column and vertically into the "6" row, the indicators will indicate 5 in the 10's section and 4 in the 1's section, showing that the product of 9×6 is 54.

In my invention, each digit multiplier used is made up of two sections, essentially in the form of rectangular blocks, each of which is divided into 10 columns and 10 rows, giving a total of 100 spaces, and is based upon the tables last shown above, but, instead of the numbers appearing, as they do in the tables, each space is so formed as to cause the adding mechanism to add the number shown in that space in the tables, one section or block of each digit multiplier setting up one number in the 10's section of the tables and the other section or block setting up the corresponding number in the 1's section of the tables. By so arranging the digit multipliers that the proper numbers set up by the various 10's sections and the various 1's sections are added together, the product of the complete multiplicand and the complete multiplier is obtained.

The number of digit multipliers that is required is equal to the number of digits in the multiplicand multiplied by the number of digits in the multiplier. Thus, a machine having a capacity of five digits in the multiplicand and three digits in the multiplier, as would be required for the multiplication previously illustrated in this description, must have 5×3, or 15 digit multipliers.

GENERAL DESCRIPTION OF MACHINE

Having thus described the fundamental principles upon which the design of my invention is based, I will now describe one form of mechanism which will accomplish the desired multiplication.

In this disclosure of my invention, I have selected to describe a machine having a capacity of five digits, or 99,999 (or $999.99) in the multiplicand and three digits, or 999 in the multiplier. The capacity of the product in such a machine is eight digits, as the highest possible product is 99,999×999, or 99,899,001 (or $998,- 990.01). It is to be understood that my invention is not limited to a machine having the number of digits recited above, as the principles used in this machine can be applied to machines having a larger or a smaller number of digits in either the multiplicand or the multiplier.

Although the multiplying mechanism herein described can be incorporated in machines which also include adding and subtracting mechanism, used either in connection with the multiplying mechanism or independently, as desired, and although printing facilities can be provided, I have elected, for the purpose of simplification, to describe a machine which does multiplying only and which does not print. I have also elected to show a hand-operated machine, although a motor-operated machine of this type is entirely practical and is usually faster.

Referring to the drawings, Figure 1 is a top view of the preferred embodiment of the elected machine, showing the arrangement of the keyboard and of the other controls which are used by the operator.

Figure 3 is a view corresponding to Figure 2; but with the cover removed so as to disclose the mechanism.

Figure 6 shows the arrangement of the digit multipliers without the surrounding mechanism and is a top view of these parts taken along line 6—6 in Figure 5.

Figure 7 is an enlarged top view of the 10's block of one of the digit multipliers, showing diagrammatically its 100 positions and the amount which each one of these positions must cause to be added to the adding mechanism.

Figure 8 is an enlarged top view of the 1's block of one of the digit multipliers, showing diagrammatically its 100 positions and the amount which each one of these positions must cause to be added to the adding mechanism.

Figure 9 is a vertical sectional view through the 10's block of the digit multiplier, taken along line 9—9 in Figure 7. A cross sectional view taken on the line 9'—9' is identical in cross sectional area.

Figure 10 is another vertical sectional view through the 10's block of the digit multiplier, taken along line 10—10 in Figure 7. A cross sectional view taken on line 10'—10' is identical in cross sectional area.

Figure 11 is another vertical sectional view through the 10's block of the digit multiplier, taken along line 11—11 in Figure 7. A cross sectional view taken on line 11'—11' is identical in cross sectional area.

Figure 12 is a vertical sectional view through the 1's block of the digit multiplier, taken along line 12—12 in Figure 8. A cross sectional view taken on line 12'—12' is identical in cross sectional area.

Figure 13 is another vertical sectional view through the 1's block of the digit multiplier, taken along line 13—13 in Figure 8. A cross sectional view taken on line 13'—13' is identical in cross sectional area.

Figure 14 is another vertical sectional view through the 1's block of the digit multiplier, taken along line 14—14 in Figure 8. A cross sectional view taken on line 14'—14' is identical in cross sectional area.

Figure 5:
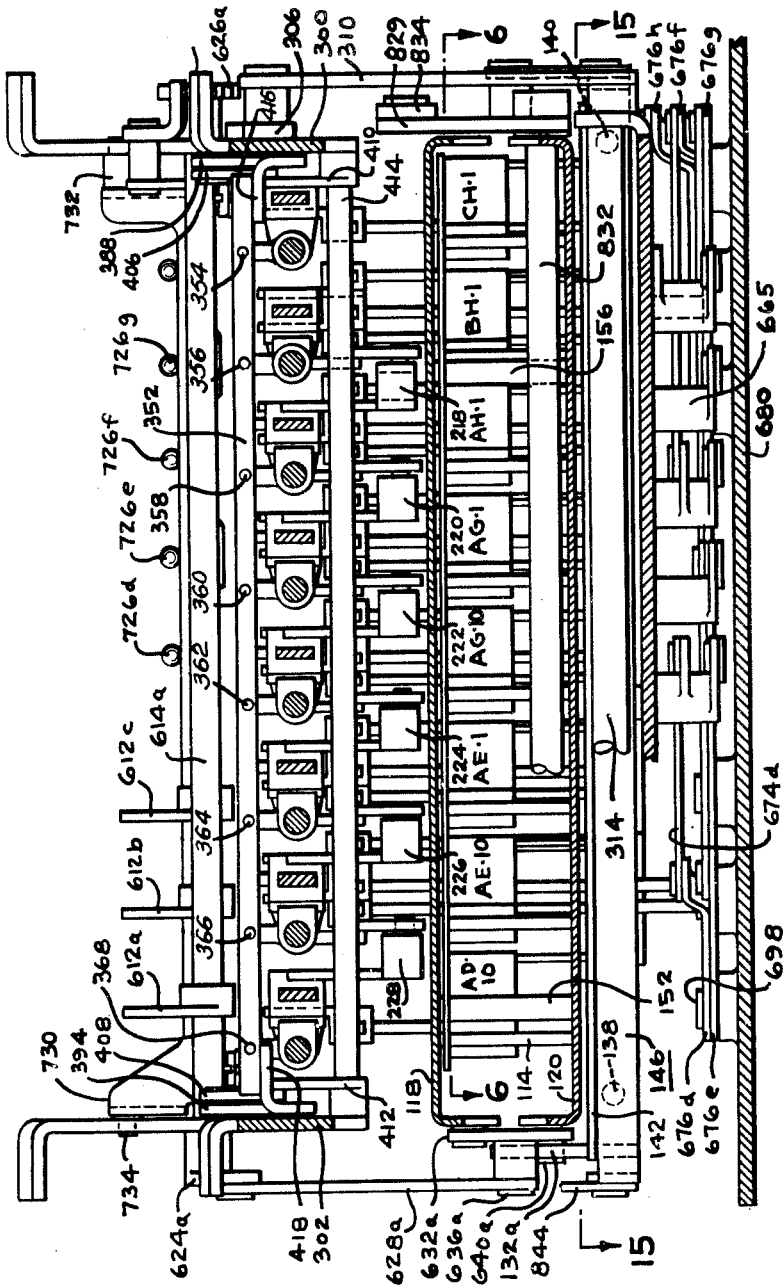
Figure 5 is a vertical sectional view as shown in Figure 4, taken approximately along line 5—5, and shows essentially a front view of this mechanism.
Figure 15:
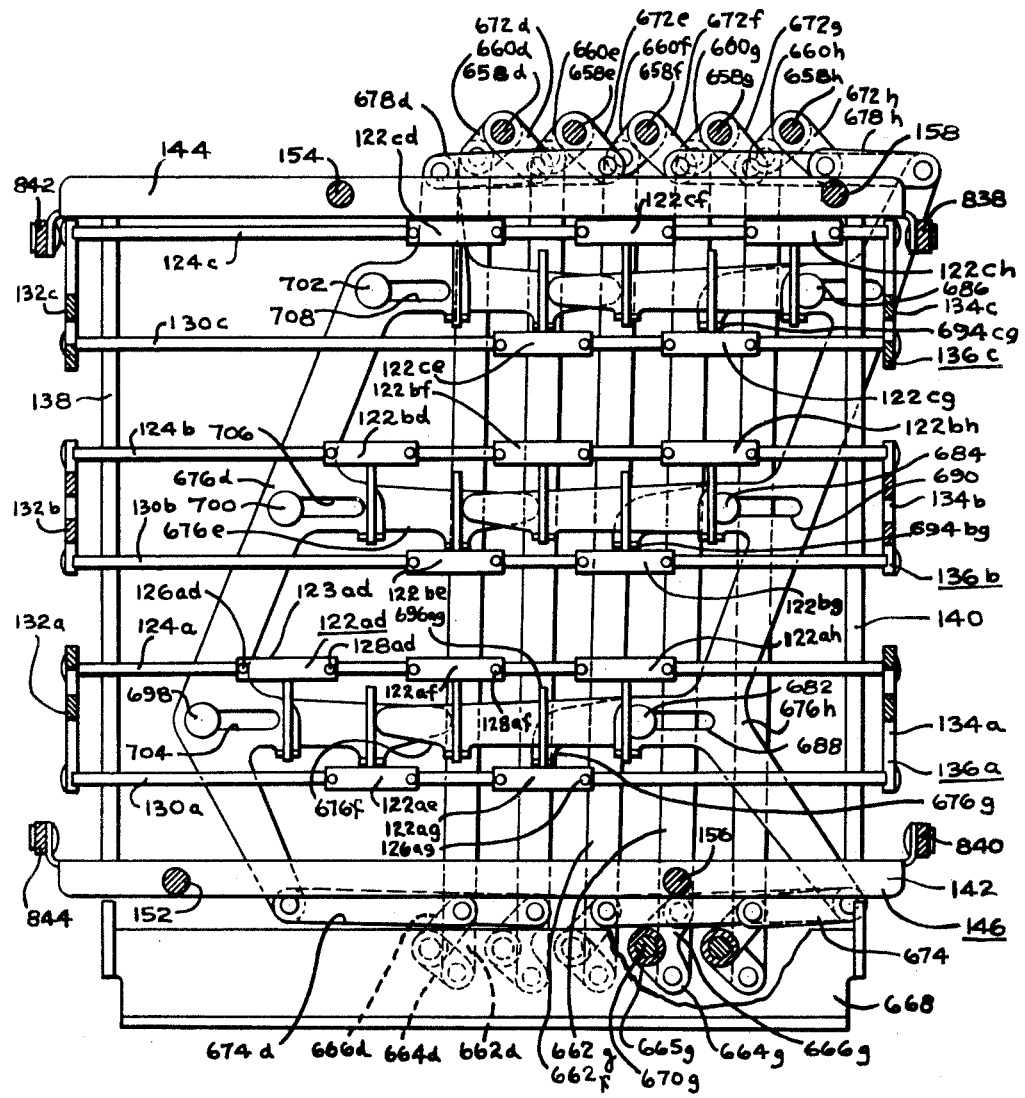

Figure 15 is a horizontal sectional view taken along line 15—15, in Figure 5, showing the selectors for the digit multipliers, their carriers and the mechanism which causes the transverse shifting of the selectors.

Figures 16, 17:
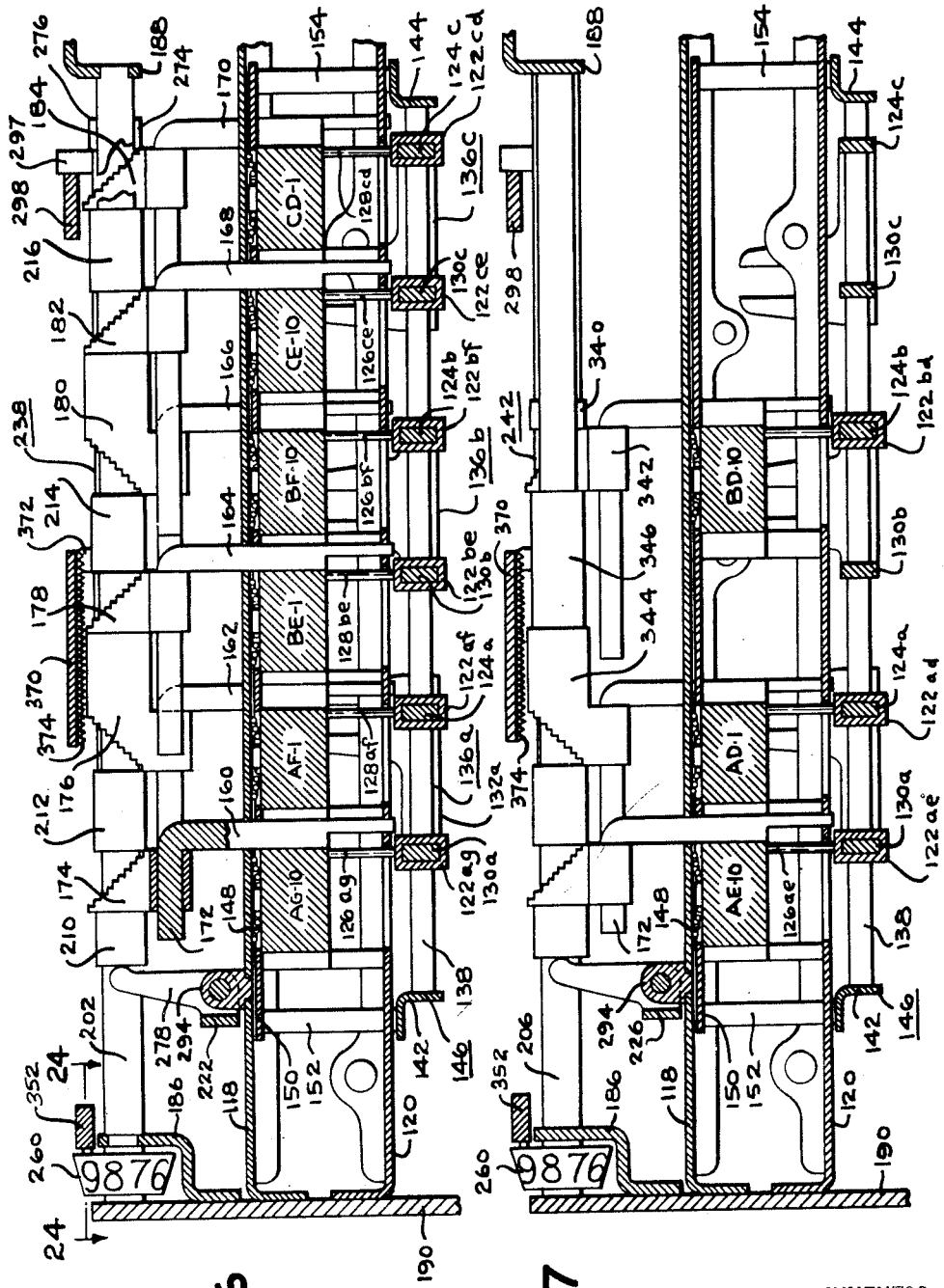
Figure 20:
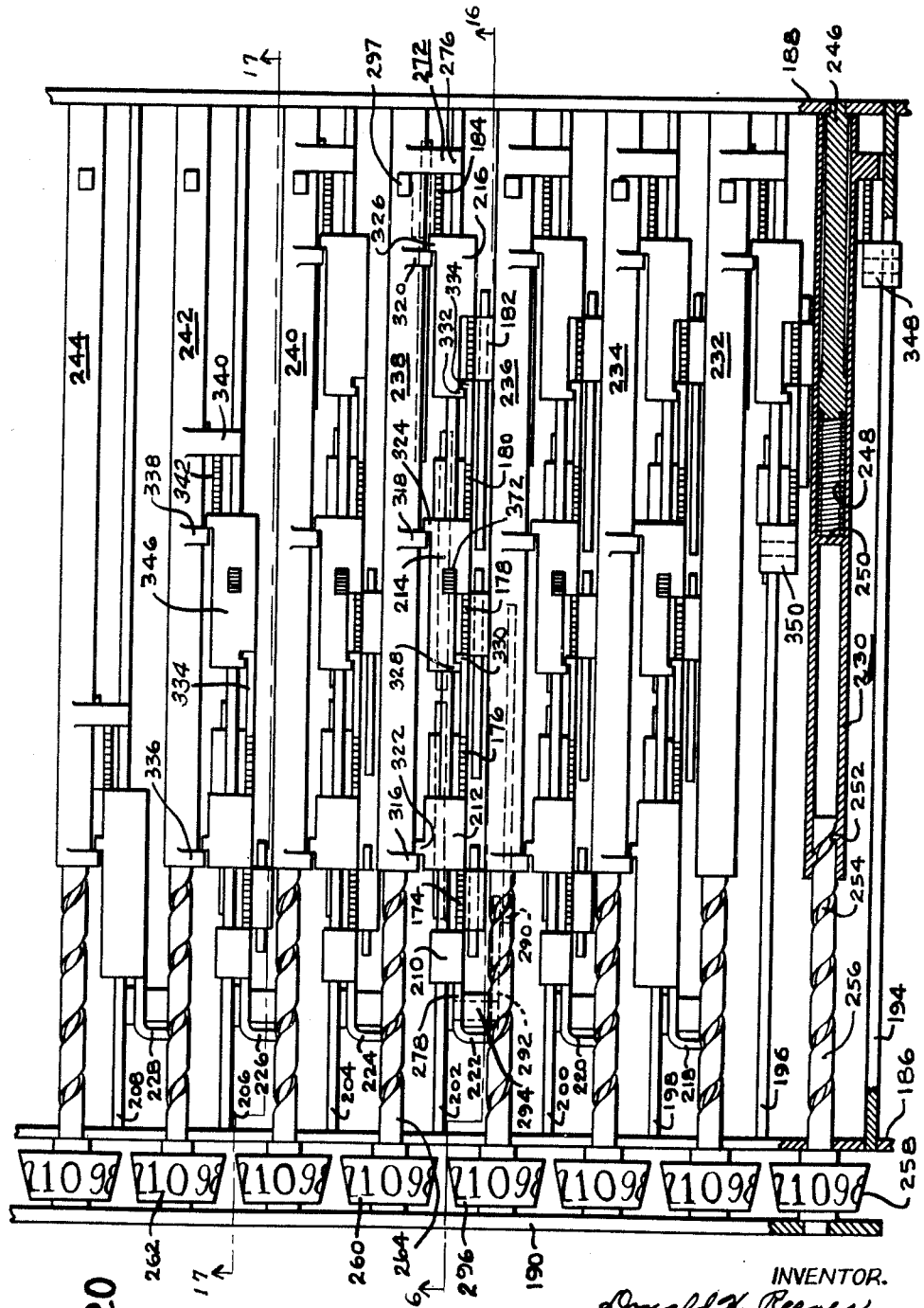

Figure 16 is a vertical sectional view taken along the line 16—16 in Figure 6 and Figure 20 and shows one column of the digit multiplier blocks, their selectors and the adding mechanism connected thereto.

Figure 17 shows a vertical sectional view taken along line 17—17, as shown in Figure 6 and Figure 20, and shows another column of the digit multiplier blocks, their selectors and the adding mechanism connected thereto.

Figure 18:
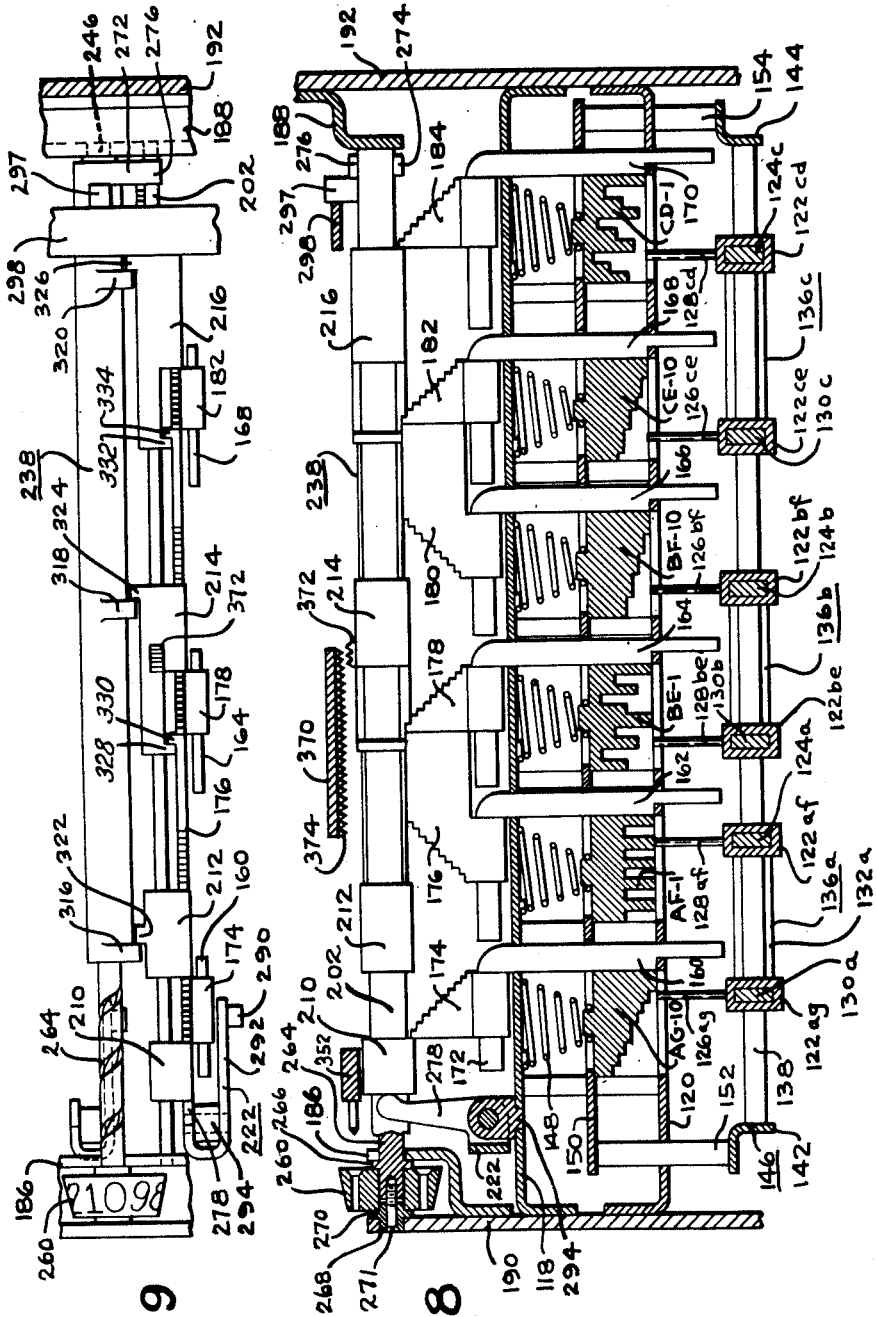

Figure 18 shows the mechanism that is shown in Figure 16; but spread out so that it can be more readily understood and some parts of the mechanism omitted, so as to better disclose the remaining mechanism. This figure shows the parts in their proper positions when the carriage is lowered and the selectors are shifted into place.

Figure 18a shows the same parts after the carriage has been raised; but before adding has taken place.

Figure 18b shows the same parts after adding has taken place.

Figure 19:
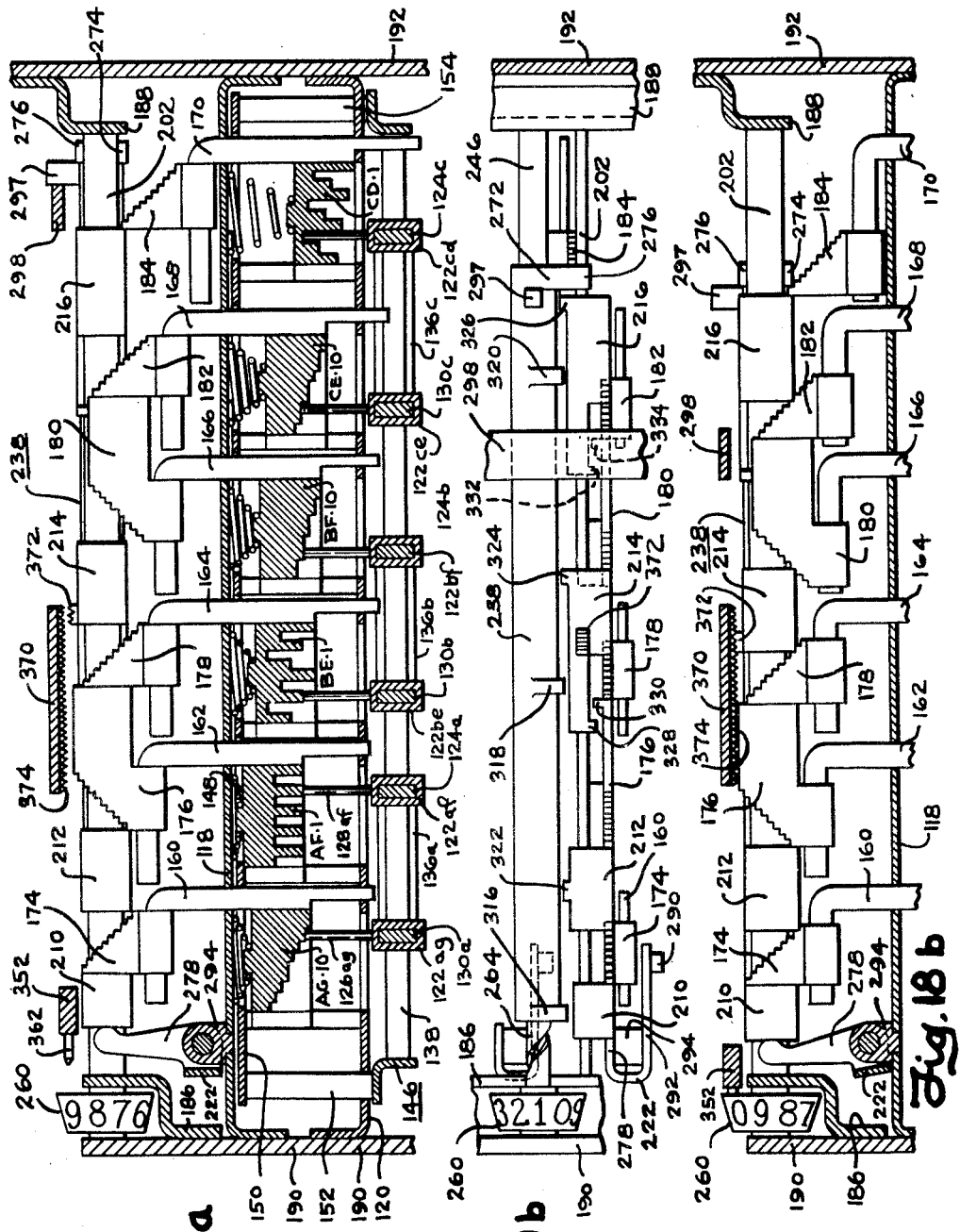

Figure 19 is a top view of the parts shown in Figure 18 and in Figure 18a.

Figure 19b is a top view of the parts as shown in Figure 18b.

Figure 20 is a top view of the adding mechanism; but with the aligning bars removed so as to show more completely the remaining parts.

Figure 21 is a perspective view of the parts shown in Figure 16.

Figure 22 is a perspective view of the transfer mechanism before any transfer has taken place.

Figure 22a is a perspective view of the same transfer mechanism after a transfer has taken place.

Figure 23 is a rear view of one of the numeral wheels, showing the holes which are used for their alignment.

Figure 24 is a horizontal sectional view taken along the line 24—24 in Figure 16 and taken through the uppermost aligning hole in each numeral wheel, showing the numeral wheels and the aligning bar.

Figure 4:
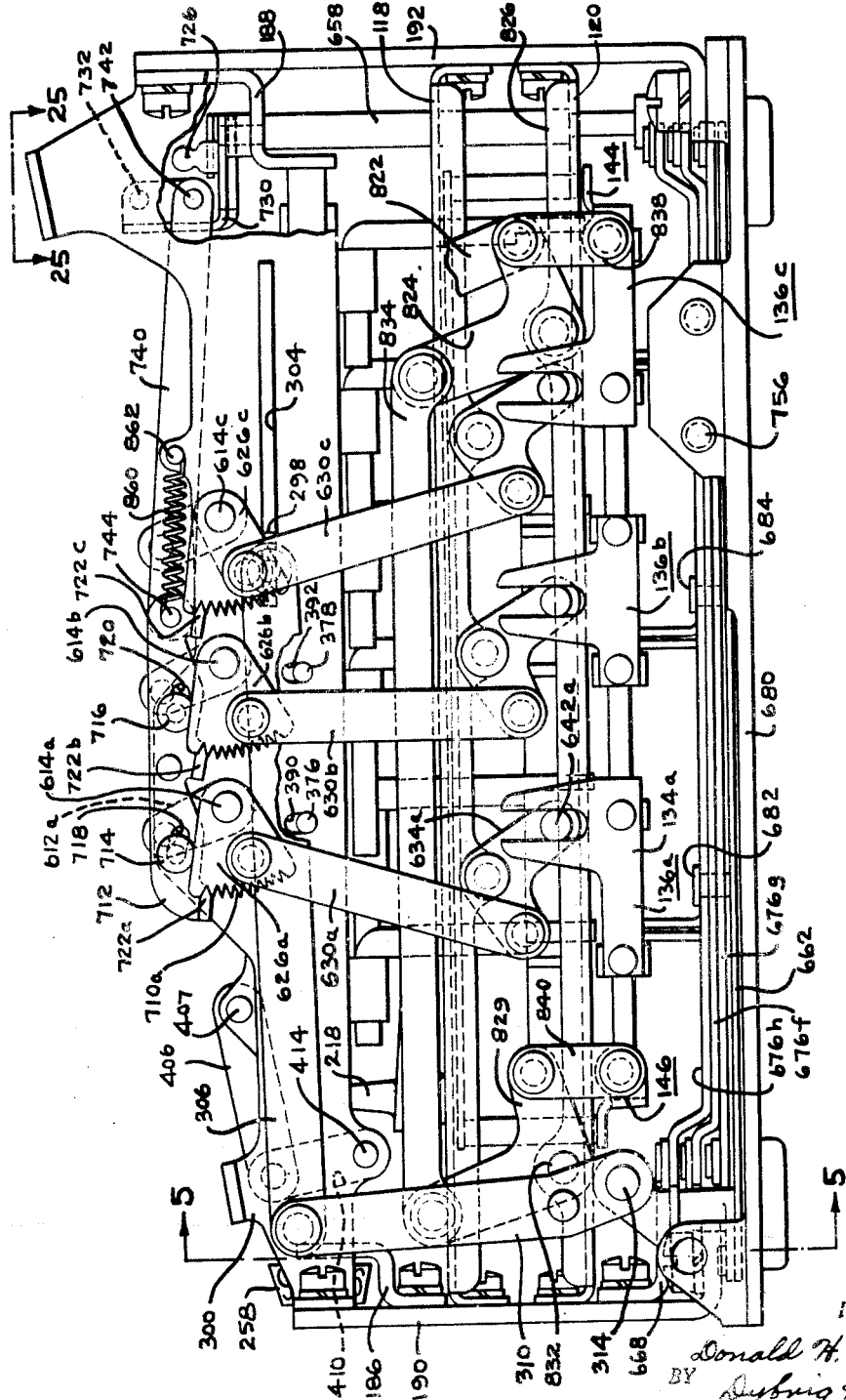
Figure 4 is a side view of the mechanism showing mainly those parts which control the operation of the digit multipliers; but omitting the keyboard and its connections to this mechanism.

Figure 25 shows a top view of that portion of Figure 4 which is indicated by the line 25—25 in Figure 4.

Figure 26 is a fragmentary front view of the shafts and their upper segments which are shown in Figure 25.

Figure 27 is a fragmentary top view of the adding mechanism aligning members, their operating members and the members which support them.

Figure 28 is a side view, partially in section, of the members shown in Figure 27 and is taken substantially along the line 28—28 in Figure 27.

Figure 29 is a vertical sectional view of the members shown in Figures 27 and 28 and is essentially a front view of these members.

Figure 30 is a view in perspective showing one of the digit multiplier selectors, together with its mounting and the means for shifting it into the required positions.

Figures 1, 2:
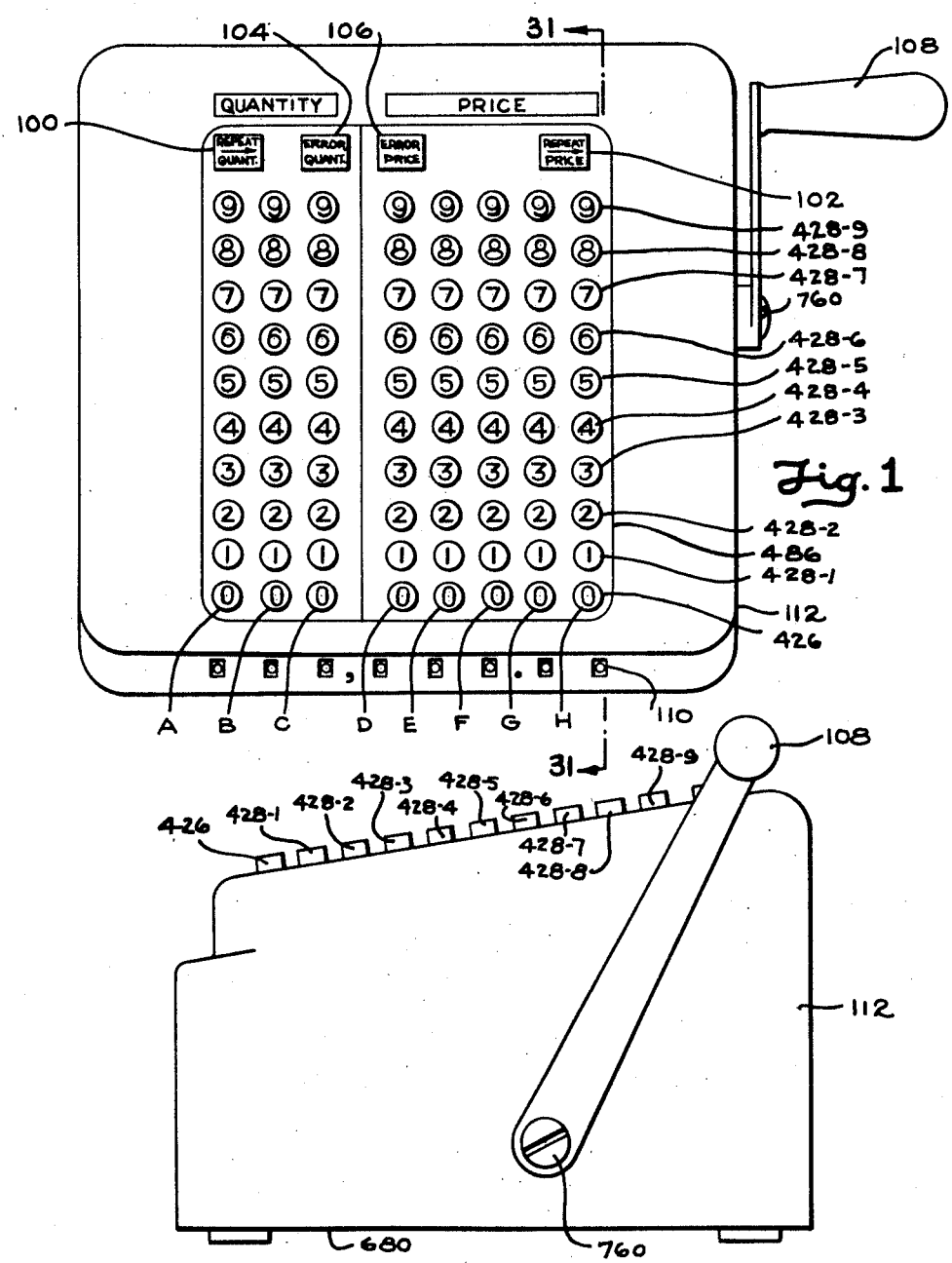
Figure 2 is a side view of the same machine.

Figure 31 is a vertical sectional view taken approximately along the line 31—31 in Figure 1; but showing only one of the keybanks and the parts directly related thereto.

Figure 32 is a vertical sectional view through one of the amount keys and is taken along the line 32—32 in Figure 31.

Figure 33 is an enlarged vertical sectional view longitudinally of a portion of the keybank showing in detail the shape of the detent, and is taken along the line 33—33 in Figure 32.

Figure 34 is another enlarged vertical sectional view longitudinally of a portion of the keybank, showing the key interlocks, and is taken along the line 34—34 in Figure 32.

Figure 35 is a substantially horizontal sectional view of a portion of the keybank, showing the zero stop bar resetting cam, and is taken along the line 35—35 in Figure 31.

Figure 36 is a substantially horizontal sectional view of a portion of the keybank, showing the front end of the zero stop bar and its relation to the other parts, and is taken along the line 36—36 in Figures 31 and 32.

Figure 37 is a substantially horizontal sectional view taken along the line 37—37 in Figure 31, showing the detent releasing and locking mechanism.

Figure 38 is a vertical sectional view, taken along the line 38—38 in Figure 37, showing the relation of certain detent releasing parts.

Figure 39 is a substantially vertical sectional view through the "Repeat" key and is taken along the line 39—39 in Figure 37.

Figure 40 is a vertical sectional view through the "Error" key and is taken along the line 40—40 in Figure 37.

Figure 41 is a substantially horizontal sectional view taken along the line 41—41 in Figure 31; but showing only the keybank slides and the parts which operate them and which are connected thereto.

Figure 42 is a vertical sectional view along the line 42—42 in Figure 41, and shows the relative positions of certain parts which are on the keybank operating shaft.

Figure 43 is a vertical sectional view taken along the line 43—43, in Figure 41, showing the keybank slides and their connections to the operating shaft and to the selector mechanism, the parts being shown in the positions which they assume at the end of the operation of the machine when no amount key was depressed in that keybank during the operation just completed.

Figure 43a shows the same parts in the positions which they assume during that portion of the operation when the keybank slides are fully advanced and when no amount key is depressed in that keybank.

Figure 43b shows the same parts in the same period of the operation as in Figure 43a; but with the "7" key depressed.

Figure 43c shows the same parts in the positions which they assume at the end of the operation when the "7" key has been depressed in the operation just completed.

Figure 44 is a vertical sectional view of the cam member, its followers and its supports and is taken along the line 44—44 in Figure 3.

Figure 45 is a vertical sectional view showing the cam slots on the outer surface of the cam member, their follows and connections, and is taken along the line 45—45 in Figure 44.

Figure 46 shows some of the parts which are shown in Figure 45; but in the positions which they will assume at another part of the operation cycle.

Figure 47 shows some of the parts which are shown in Figure 46; but in the positions which they will assume in another part of the operation cycle.

Figure 48 is a vertical sectional view showing the cam slots on the inner surface of the cam member, their followers and connections, and is taken essentially along the line 48—48 in Figure 44.

Figure 49 shows some of the parts which are shown in Figure 48; but in the positions which they assume in another part of the operation cycle.

Most of the figures described above show the various machine parts in the positions in which they will be at the completion of an operation of the machine when no amount keys have been depressed during that operation. The exceptions to this are Figures 18, 18a, 18b, 19, 19b, 22a, 27, 28, 29, 33, 43a, 43b, 43c, 46, 47 and 49.

EXTERNAL PARTS

In the drawings, reference characters A, B and C designate the three rows of keys which are used for the multiplier, which may be "Quantity," as shown in Figure 1, or any other desired designation, while D, E, F, G and H are the five rows of keys used for the multiplicand, which may be "Price," as shown in Figure 1, or any other desired designation. A "Repeat" key 100, when moved to the right, causes the keys in rows A, B and C to remain depressed at the end of the operation so that the same multiplier can be used for the next operation without the necessity of again depressing keys in these rows. Another "Repeat" key 102 serves the same purpose for the multiplicand by causing the keys in rows D, E, F, G and H to remain depressed. When both of these keys, 100 and 102, are in their left-hand positions, all amount keys are released by the end of each operation. A key 104, when pressed, releases any depressed keys in the multiplier (rows A, B and C), while a key 106, when pressed, releases any depressed keys in the multiplicand (rows D, E, F, G and H). Since the keys 104 and 106 are side by side, it is a simple matter to press both keys simultaneously in order to release all depressed keys in both the multiplier and the multiplicand. If a wrong key is depressed in any one row, it can be corrected by pressing another key in the same row, which releases the depressed key, the last depressed key remaining depressed unless it is the "0" key, which never remains depressed. An operating handle 108 is pulled forward by the operator and then released, in order to cause the mechanism to make the desired computation. The above are all of the parts that are handled by the operator.

A row of numerals 110 show through openings in a case 112. These numerals, after each operation of the machine, show the product of the amounts which were registered on the multiplicand and the multiplier keys and they remain so until the next operation, when all numerals first change to "0" and then to the amount of the new product.

THE DIGIT MULTIPLIERS

Referring to Figure 6, which shows the arrangement of the digit multipliers, the 10's blocks of the digit multipliers are designated AD-10, AE-10, etc., while the 1's blocks are designated AD-1, AE-1, etc. AD-10 and AD-1, combined, constitute one digit multiplier, which we will call AD. Likewise, all pairs having the same letters combine to form other complete digit multipliers.

By comparing Figure 6 with the arrangement of the partial product multiplication shown in Example III, it will be seen that the arrangement of the digit multipliers in Figure 6 is identical with the arrangement of the partial products given in Example III. Multiplication, as accomplished by this machine, follows mechanically exactly the method shown in Example III. Thus, the digit multiplier AD (combining AD-10 and AD-1) is controlled by the key rows A and D in such a manner as to cause the product of the numbers which have been registered on these two rows of keys to be added in the adding mechanism. The digit multiplier blocks may be referred to as product blocks, as these blocks are used to obtain the product of two digits. If, therefore, key "2" is depressed in row A and key "7" is depressed in row D, corresponding to the first digits of the multiplier and of the multiplicand, as shown in the Example III, then the 10's block (AD-10) of the digit multiplier AD must cause 1 to be added on the adding mechanism in the proper column and the 1's block (AD-1) must cause 4 to be added in its proper column, so as a whole, this digit multiplier AD causes 14 to be added. In like manner, each row of keys in the multiplier combines with each row of keys in the multiplicand to control a separate digit multiplier. The number of digit multipliers needed is therefore equal to the product of the number of rows of keys in the multiplicand and the number of rows of keys in the multiplier. In the present case, where there are three rows of keys in the multiplier and five rows of keys in the multiplicand, it is therefore necessary to have three times five, or fifteen digit multipliers. In the machine herein described, the mechanism is so arranged that digit multiplier AD is controlled by key rows A and D, AE is controlled by key rows A and E, etc.

In the digit multipliers, all of the 10's blocks (AD-10, AE-10, etc.) are identical and all of the 1's blocks (AD-1, AE-1, etc.) are identical, excepting a slight change in the mounting boss on the top block in each column, as best seen in Figure 6. Each of these digit multiplier blocks, whether a 10's block or a 1's block, is movable vertically and is guided in that movement by a stationary guide, such as 114 and 115, and by a guide which is secured to the block, such as 116, these guides being supported by two plates 118 and 120. The amount of vertical movement of each digit multiplier block determines the amount which that block causes to be added in the adding mechanism in a way which will be explained later. If a digit multiplier block is raised to the full extent of its travel, nothing is added by it on the adding mechanism, while if raised not at all, 9 is added by it on the adding mechanism. Dividing the space between no travel and full travel into nine spaces, if the block is raised one space less than its full travel, or eight spaces from its starting position, it causes 1 to be added on the adding mechanism, if raised two spaces less than its full travel, or seven spaces from its starting position, it causes 2 to be added to the adding mechanism, etc. The amount that the two blocks of each digit multiplier must be raised is therefore determined by the amount of the product of the two digits which that digit multiplier represents. Thus, in the example previously given, where the first digit of the multiplicand, which would be registered by the operator on key row D, is 7 and the first digit of the multiplier, which would be registered on key row A, is 2, the product of these two digits is 14, so the digit multiplier block AD-10 must be raised one space less than its full travel, or eight spaces, while the block AD-1 must must be raised four spaces less than its full travel, or five spaces, in order to cause 14 to be added on the adding mechanism.

Referring to Figures 7 and 8, it will be seen that each of the digit multiplier blocks is shown divided into 100 spaces arranged in ten horizontal rows and ten transverse tiers or columns. These spaces, which are shown in Figures 7 and 8 on the tops of the blocks for simplicity in explanation, represent spaces directly below them which are so formed as to cause the proper travel of the block. One of these spaces on each digit multiplier block is selected for use during each operation of the machine, the space selected being determined by the keys which are depressed in the multiplicand and in the multiplier key rows which control that particular digit multiplier, the multiplicand keys determining the transverse tier or column which is selected, from 0 (no key depressed) selecting the column to the extreme right, to 9 selecting the column to the extreme left, while the multiplier keys determine the horizontal row selected, from 0 at the top to 9 at the bottom. Thus, in the example which we are using, where the "7" key is depressed in row D and the "2" key is depressed in row A, the spaces which will be selected on both AD-10 and AD-1 are in the eighth column from the right (the first column representing 0) and the third row from the top (the top row representing 0). Referring to Figure 7, it will be found that this space is marked "1," while in Figure 8 the corresponding space is marked "4." These represent the amounts which must be added by the digit multiplier on the adding mechanism, so in this case the amount to be added is 14, or the product of 7 times 2. It is therefore necessary that when these particular spaces are selected, the block AD-10 shall be raised eight spaces, or one less than its full travel, in order to cause 1 to be added on the adding mechanism, while the block AD-1 shall be raised five spaces, or four spaces less than its full travel, in order to cause 4 to be added on the adding mechanism.

THE SELECTORS

Selection of the proper spaces on the two blocks of each digit multiplier is accomplished by means of a selector, such as 122ad, best shown in Figure 15, there being one selector for each digit multiplier so that in this particular machine there are fifteen. Each selector consists of a body portion, such as 123ad, which slides on a rectangular bar, such as 124a, and two upwardly extending rods, such as 126ad and 128ad. The bar 124a is a part of a unitary frame 136a, which also includes a bar 130a and two end pieces 132a and 134a. There is one such frame for each row of keys in the multiplier, in this case, three, designated 136a, which is controlled by key row A, 136b, which is controlled by key row B and 136C, which is controlled by key row C. On the two bars, such as 124a and 130a, of each frame, are mounted as many selectors, such as 122ad, as there are rows of keys in the multiplicand, in this case, five, the arrangement of which is best shown in Figure 15. The three frames 136a, 136b and 136c are slidably mounted on two rods 138 and 140 which, together with end pieces 142 and 144, constitute a carriage 146 for the three frames.

Since each selector, such as 122ad, can move transversely of the mechanism on a bar, such as 124a or 130a, and can move longitudinally of the mechanism by moving the frame, such as 136a, on the rods 138 and 140, it is possible for the upwardly extending rods, such as 126ad and 128ad, on the selector 122ad, to cover a certain amount of area. The selectors 122 may be referred to as having movements in the XY planes. The mechanism is so arranged that when the various selectors are in the positions shown in Figure 15, the upwardly extending rods are directly beneath the "0" positions, which in each case is the upper right hand corner space of the various digit multiplier blocks. Thus, the selector 122ad, which is the selector for the digit multiplier AD, has the rod 126ad directly below the "0" position of the 10's block AD-10 and the rod 128ad directly below the "0" position of the 1's block AD-1. By moving the selector 122ad transversely on the bar 124a and by moving the frame 136a longitudinally on the rods 138 and 140, the upwardly extending rods 126ad and 128ad can be placed under any desired spaces on the digit multiplier blocks AD-10 and AD-1 respectively. In like manner, the other selectors can be moved in relation to their respective digit multipliers.

The frame 136a, carrying the selectors 122ad, 122ae, 122af, 122ag and 122ah, is moved on the rods 138 and 140 by mechanism controlled by the key row A, while the frame 136b is moved by mechanism controlled by the key row B and the frame 136c is moved by mechanism controlled by the key row C, the amount of the movement of each frame being determined by the key which is depressed in its controlling key row, the "1" key causing the frame to be moved one space from the position shown in Figure 15, the "2" key causing it to be moved two spaces, etc. Thus, if key rows A, B and C represent the multipliers, the adjustment of selected keys in these rows selects the proper rows on the multiplier product blocks. If no key is depressed, the frame will remain in its "0" position, as shown. Likewise, the selectors 122ad, 122bd and 122cd are moved transversely on their respective rods by mechanism controlled by the key row D, selectors 122ae, 122be and 122ce are moved by mechanism controlled by the key row E, 122af, 122bf and 122cf are moved by mechanism controlled by the key row F, 122ag, 122bg and 122cg are moved by mechanism controlled by the key row G and 122ah, 122bh and 122ch are moved by mechanism controlled by key row H. In each case, the amount of movement of the selector on its supporting rod depends upon the key which is depressed in its controlling key row, the "1" key causing the effected selectors to move one space to the left of the position shown in Figure 15, the "2" key causing them to move two spaces, etc., while the selectors will remain in the positions shown if no key is depressed.

Referring again to the sample multiplication given in Example III, depressing the "2" key in row A and the "7" key in row D will cause the selector 122ad (and also all of the other selectors on the frame 136a) to be moved longitudinally toward the front of the machine a distance of two spaces, or until it is under the "2" horizontal row on the digit multiplier AD, and will cause this same selector 122ad (and also 122bd and 122cd) to be moved transversely to the left a distance of seven spaces, or until the two upwardly extending rods 126ad and 128ad are directly under the "7" vertical columns on the digit multiplier blocks AD-10 and AD-1 respectively. The method of accomplishing this movement will be described later under the heading "Moving the Selectors."

As previously explained, each digit multiplier block, such as AD-10 and AD-1, must be caused to rise varying amounts depending upon the amount which it must cause to be added on the adding mechanism, the amount of rise being nine spaces, which is the full vertical travel of the block, if nothing is to be added, one space less, or eight spaces of rise, if 1 is to be added, two spaces less, or seven spaces of rise, if 2 is to be added, etc., until the other extreme is reached where there is no rise if 9 is to be added. To accomplish this, the carriage 146 is caused to rise an amount equal to nine spaces, which is the maximum that any digit multiplier block must be raised. The upwardly extending rods, such as 126ad and 128ad, on each selector are of such length that when the carriage 146 is in its lowest position, the tops of these rods are just even with the bottoms of the digit multiplier blocks, such as AD-10 and AD-1. With this arrangement, if a rod, such as 128ad, comes in contact with a part of its digit multiplier block, such as AD-1, as soon as it starts to rise, it will cause that digit multiplier block to rise the same amount as the carriage rises, or nine spaces. If, however, the rod rises the equivalent of one space before coming in contact with the digit multiplier block, it will cause the digit multiplier block to rise only eight spaces, etc., while if the rod does not come in contact with the digit multiplier block until the rod has been raised the full amount of its travel, the digit multiplier block will not be raised at all. Thus it will be seen that the amount which any digit multiplier block is raised can be controlled by controlling the distance which its selector rod rises before coming in contact with that digit multiplier block. Thus, it is seen that the selectors 128a, in addition to movements in the X—Y planes, also have a movement in the Z plane.

Referring again to Figures 7 and 8, the numbers in the various spaces, as previously explained, indicate the number which each space must cause to be added on the adding mechanism. These numbers also indicate, therefore, the amount which the product block must rise when each of these spaces is selected, that amount of rise being equal to nine spaces minus the number of spaces shown by the number in the spaces in Figures 7 and 8. Expressed differently, nine minus the number in each space equals the number of spaces which that digit multiplier block must be caused to rise when its selector rod is directly below that space and the carriage 146 is raised. Referring to Figure 8, it will be seen that the second row from the top, on line 12—12, and the second row from the right, on line 12'—12', each have numbers from 0 to 9. Figure 12 shows a cross section through this digit multiplier block on either line 12—12 or line 12'—12', as the two will be the same. In Figure 12, it will be seen that the solid portion extends to the bottom of the block on the right hand side, which is the position where nothing must be added on the adding mechanism. Thus, if the upwardly extending rod, such as 126ad, on the selector 122ad, is under this part of the block, it will cause the block to rise nine spaces, which will cause nothing to be added on the adding mechanism. The next space to the left allows the selector rod to rise one space before contacting the block, so the block will be raised only eight spaces and one will be added on the adding mechanism. Going over to the extreme left hand side of the block, the selector rod can rise its full travel before coming in contact with the block, so the block will not be raised at all and nine will be added on the adding mechanism. Thus it will be seen that the amount which is added on the adding mechanism is equal to the number of spaces which the selector rod rises before making contact with the block. Figures 9, 10, 11, 12, 13 and 14 show various vertical cross sections through the two blocks of a digit multiplier. Each of these figures applies to one horizontal row and the corresponding vertical column, as these are always the same. The small numbers on these cross sections indicate the amount which each step will cause to be added on the adding mechanism.

Figure 16 is a vertical sectional view taken through the "0" columns of the digit multiplier blocks AG-10, AF-1, BE-1, BF-10, CE-10 and CD-1. This figure shows the relative positions of the digit multiplier blocks, the selectors, the mounting frames for the selectors and the carriage which carries the selector mounting frames, all being shown as they appear at the end of an operation of the machine when no amount keys have been depressed in either the multiplicand or in the multiplier rows. Under these conditions, all of the vertical rods, such as 126ag on selector 122ag, are beneath the "0" spaces on their respective digit multiplier blocks, which spaces are the spaces to the extreme right in the top row of each block. Since this sectional view is taken through the "0" columns of all of the digit multiplier blocks that are shown and since each block must be raised the full amount of its travel, regardless of which row in this column is selected, the sectional view shows no indentations, such as are shown in Figures 9 to 14 inclusive. This being the case, the raising of the carriage 146, which has also caused the raising of the selectors, such as 122ag, with their upwardly extending rods, such as 126ag, has raised the digit multiplier blocks, such as AG-10, to the top of their travel, as shown. Figure 18 shows the same digit multiplier blocks and selectors as are shown in Figure 16, but with the carriage 146 lowered and with the selectors in the proper positions for operation when 277 has been registered on the multiplier keys and 76584 on the multiplicand keys in order to obtain the product of the two numbers shown in the Example III. In this case, the frame 136a, which is controlled by the key bank A, has been moved forward two spaces, since "2" has been registered on the keybank A. Likewise, the frame 136b has been moved forward seven spaces, as has also the frame 136c, since "7" has been registered on both keybanks B and C. The selector 122ag has been moved eight spaces to the left, since the "8" key in key row G is depressed. In like manner, selectors 122af and 122bf, controlled by key row F, have been moved five spaces, since the "5" key is depressed in key row F; selectors 122be and 122ce have been moved six spaces to the left, since "6" has been registered on key row E and the selector 122cd has been moved seven spaces to the left, since "7" has been registered on key row D. The other selectors, not shown in Figure 18, controlled by this problem, are actuated in a similar manner. Referring again to Figure 18, it will be seen that the selector rod 128ag can rise one space before it comes in contact with the digit multiplier block AG-10. This being the case, when the carriage 146 is raised the full amount of its travel, which is the equivalent of nine spaces, the block AG-10 will only rise eight spaces which, as previously mentioned, will cause 1 to be added on the adding mechanism in a manner which will be explained later. Since the digit multiplier AG must cause 16 to be added on the adding mechanism (the product of the "2" registered on the key row A and the "8" registered on the key row G) it is necessary that the block AG-10 cause the first digit of 16, or 1, to be added. In like manner, the selector rod 128af makes contact with the block AF-1 as soon as the carriage 146 starts to rise, so the full raising of the carriage will cause this block to rise nine spaces, adding 0 on the adding mechanism, which is the correct amount, since the product of 2 (registered on key row A) and 5 (registered on key row F) is 10. In the same way, selector rod 128be will rise two spaces before making contact with the block BE-1, so 2 will be added on the adding mechanism; selector rod 128bf will rise three spaces, so 3 will be added; selector rod 128ce will rise four spaces, so 4 will be added; selector rod 128cd will rise its entire distance, or nine spaces, without raising the block CD-1, so 9 will be added by this block. Figure 18a shows the positions of these various digit multiplier blocks after the carriage 146 has been raised.

When the various digit multiplier blocks are being raised by the selector rods, it is possible that the inertia of the blocks will be sufficient to cause a slight amount of overtravel. If this is the case, the weight of each block will tend to restore it to its proper position, but to insure quick and sure return, a spring is placed above each block, such as spring 148 above block AG-10, as best shown in Figure 16. These springs also assist in quickly lowering the various blocks when the carriage 146 is again lowered, but to insure proper return of the blocks to their lowest positions, a plate 150, which extends across the tops of all of the digit multiplier blocks and which is secured to the carriage 146 by four rods 152, 154, 156 and 158, two of which are shown in Figures 16, 17 and 18 and all of which are shown in Figure 15. Raising and lowering of the carriage 146 therefore causes the plate 150 to rise and lower simultaneously and to the same degree. When the carriage 146 is lowered, therefore, the plate 150 will force all of the digit multiplier blocks to lower into their proper positions. The rods 152, 154, 156 and 158 pass through closely fitting holes in the plate 129, thereby holding both the carriage 146 and the plate 150 in their proper horizontal positions.

THE ADDING MECHANISM

Referring to the example of multiplication which is given in Example III, it will be seen that, after the individual digits have been multiplied, there are eight columns of digits which must be added in order to arrive at the final product. Since each column of digits, excepting the ones at the extreme right and the extreme left, can add to more than 9, the total may be a number of two digits. For example, the second column from the right will, in every case, be the sum of three digits which may vary from 0+0+0 to 8+9+9, since the highest possible 10's digit is 8 (9×9=81) and the highest possible 1's digit is 9; therefore the sum of the digits in this column can be any number from 0 to 26. This requires that the first digit of this sum, if 10 or more, be added or "transferred" to the next column to the left. It may therefore be necessary to transfer either 1 or 2 from column two (counting from the right) to column three. Figuring the same way, it would seem that column threee can have a total of 9+8+8+9+9, or 43, to which can be added 2 which is transferred from the next column to the right, but it happens that there is no combination of multiplicand and multiplier which can make this column three add to more than 35, to which may be added the 2 which is transferred from the next column to the right, making a total of 37 as the maximum which can be added in column three. The maximum which can be added in column four is 43 plus 3 transferred from column three or a total of 46. The maximum which can be added in column five is 43 plus 4 transferred from column four, or a total of 47. The maximum which can be added in column six is 35 plus 4 transferred from column five, or a total of 39. The maximum which can be added in column seven is 26, the same as in column two, to which can be added 3 which is transferred from column six, or a total of 29. The maximum which can be added in column eight, the last column to the left, is 9, including the amount which is transferred from column seven. While it is true that the one digit which appears in column eight can be 8 if the first digits of the multiplicand and of the multiplier are both 9, and while it is true that under certain circumstances 2 can be transferred from column seven to column eight, it is obvious that both of these things cannot happen at the same time, as that would give a total for this column of 10, whereas the highest possible product in this machine is the product of 99,999 times 999, or 99,899,001. It is therefore obvious that when this multiplication takes place and 8 appears in column eight, only 1 is transferred from column seven to column eight. It is for similar reasons, which are considerably more complicated to figure, that columns three to seven inclusive will never have totals as high as might, at first glance, be expected. This being the case, the highest amount which must be transferred from any column to the next column to the left, is 4.

A top view of the adding mechanism, with certain alignment bars omitted, is shown in Figure 20. Figure 16, previously described in connection with the digit multipliers, also shows the adding mechanism for coluumn five, being taken approximately along the line 16—16, as shown in Figure 20. Identical adding mechanism exists in column four. In order to be able to more clearly show the operation of the parts in the adding mechanism, I have shown Figure 18, in which essentially the same parts are used as in Figure 16, but spread out in such a way as to be easier understood. Figure 19 is a top view of the parts shown in Figure 18, excepting that the alignment bars are omitted. Figure 18 shows the carriage 146 lowered, so that the digit multiplier blocks, such as AG-10, AF-1, etc. are also lowered, whereas in Figure 16 the carriage and the multiplier blocks are raised. Figure 21 shows in perspective the same parts which are shown in Figure 16.

As previously explained in connection with the digit multipliers, each of the digit multiplier blocks is secured to a guide, such as 116 in Figure 6. The corresponding guides for the digit multiplier blocks which are shown in Figure 18 are guide 160 secured to digit multiplier block AG-10, guide 162 secured to block AF-1, guide 164 secured to block BE-1, guide 166 secured to block BF-10, guide 168 secured to block CE-10 and guide 170 secured to block CD-1. As previously explained, each of these guides passes through and is guided by a hole in plate 118 and a hole in plate 120, in which holes the guides can move freely. This being the case, as each digit multiplier block, such as AG-10, is raised, its guide, such as 160, is raised the same amount. As may be seen by referring to Figures 16, 18, 18a and 22, each of these guides has a horizontal portion at its upper end, such as portion 172, this horizontal portion being rectangular in cross section. Slidably mounted on the horizontal portion, such as 172, of each guide, such as 160, is an adding member, these being 174, 176, 178, 180, 182 and 184, which are mounted on the horizontal portions of guides 160, 162, 164, 166, 168 and 170 respectively. Each of these adding members, such as 174, has ten steps, as shown. The height of each step is the same as the vertical distance from one space to the next in the digit multiplier blocks so that when a digit multiplier block is raised one space, as is the case when 8 is to be added on the adding mechanism, the adding member is also raised exactly the height of one step. The horizontal lengths of all steps are the same and can be any amount which is desired.

As may be best seen by referring to Figure 20, stationarily mounted between two supporting members 186 and 188, which in turn are secured to two vertical end pieces 190 and 192, are eight rectangular bars 194, 196, 198, 200, 202, 204, 206 and 208, one for each column to be added. On the bar 202, which is the one used for the fifth column of the adding mechanism, now being explained, there are four slidably mounted blocks, 210, 212, 214 and 216. When the carriage 146 is lowered, these slidably mounted blocks are in the positions shown in Figure 18.

In the rows of adding mechanism for the third to the eighth columns, inclusive, starting from the right hand side, there are transfer members 218, 220, 222, 224, 226 and 228, as best shown in Figure 20, which determine the positions of the first sliding block in each row. For example, the transfer member 222 determines the position of the block 210 on the bar 202, each such block being in one of five positions, depending upon the position of the transfer member, the position depending upon whether 0, 1, 2, 3 or 4 must be transferred from the next column to the right. The means of accomplishing this will be described later.

Referring again to Figure 18, the various selectors, such as 122ag, are shown in the positions which they will assume if the multiplication in Example III is to be computed by the machine, in which case the multiplicand of 76584 has been registered upon the multiplicand keys and the multiplier of 277 has been registered upon the multiplier keys. As previously explained, the selector rod 126ag will rise one space before making contact with the digit multiplier block AG-10, so this block will rise eight spaces, thereby causing the adding member 174 to rise eight steps. In the same way, the selector rod 128af makes contact with the block AF-1 as soon as the rod starts to rise, so the block will rise nine spaces and the adding member 176 will rise nine steps. Likewise, the block BE-1 will rise seven spaces and the adding member 178 will rise seven steps, the block BF-10 will rise six spaces and the adding member 180 will rise six steps, the block CE-10 will rise five spaces and the adding member 182 will rise five steps, while the block CD-1 will not rise at all, so the adding member 184 also will not rise. Figure 18a shows the positions of the selectors, the digit multiplier blocks and the adding members after they have thus been raised by the raising of the carriage 146.

As best seen in Figure 20, in connection with each row of adding members, there is an adding member actuator, shown as 230, 232, 234, 236, 238, 240, 242 and 244. Each of these actuators has one end slidably mounted upon a guide 246, as shown in connection with the actuator 230 in Figure 20. A compression spring 248 mounted between the guide 246 and a shoulder 250 of the actuator tends to move the actuator to the left. At the left end of each actuator is an internal helical projection 252, in the nature of an elongated thread, which engages a helical slot 254 in a rod 256. On the other end of each rod, such as 256, is mounted a numeral wheel, such as 258, on the outer surface of which appear equally spaced numerals from 0 to 9 inclusive. These are the numerals which are referred to in Figure 1 as the row of numerals 110, which show through openings in the case 112. Each numeral wheel, such as 258, is so mounted on its rod, such as 256, that it can be turned in relation to the rod and then clamped in place. The means of doing this is best shown in Figure 18, which shows the numeral wheel 260, which is identical to the numeral wheel 258, and the end of rod 264, which is identical to the rod 256. Near the end of each rod, such as 264, is a shoulder 266, while a clamping member has a shoulder 270. A screw 271 secures the clamping member, such as 268, to the rod, such as 264, clamping the wheel 260 between the shoulders 266 and 270. The outer end of the clamping member, such as 268, projects through a hole in the end piece 190 and acts as a pivot for the rod 264 and the wheel 260. The shoulders 266 and 270 bear against the supporting member 186 and the end piece 190 respectively, the entire assembly being such that the rod 264, the wheel 260 and the clamping member can turn freely as a unit without appreciable endwise movement.

As best seen in Figures 16 and 21, each actuator, such as 230 or 238, has a projection, such as 272 on actuator 238, from which extend two prongs 274 and 276. These prongs 274 and 276 engage the lower and upper edges respectively of the rectangular bar, such as 202, thereby preventing rotation of the actuator. The arrangement of parts being as just described, if an actuator, such as 238, is allowed to move to the left under the influence of the compression spring, such as 248 shown in Figure 20, then the rod, such as 256, must rotate in relation to the actuator and, since the actuator is prevented from rotating by the prongs, such as 274 and 275, the rod, such as 256, must rotate, at the same time causing the numeral wheel, such as 258, to rotate. The helical cut in the rod, such as 256, is so formed that the rod will turn exactly one revolution when the actuator moved to the left a distance equal to ten times the horizontal length of the steps, which are a part of the adding members, such as 174. Since the length of ten steps on any adding member causes one revolution of the numeral wheel, such as 258, and since this numeral wheel has ten equally spaced numbers around its perimeter, the movement of the actuator by an amount equal to the length of one step causes the wheel to turn from one numeral to the next. Thus, if the numeral 0 is at the top before the actuator starts to move and the actuator moves one step, the numeral 1 will be at the top, while if the actuator moves two steps, the numeral 2 will be at the top, etc., the numeral at the top showing the number of steps which the actuator has moved, provided the movement has not been greater than nine steps, as the tenth step returns the wheel to its original position where the 0 is at the top, after which it repeats. In the same way, the wheel will show 0 at the top when the actuator has moved 0, 10, 20, 30 or 40 steps, it will show 1 at the top when the actuator has moved 1, 11, 21, 31 or 41 steps, etc.

Referring again to Figure 16, which shows the relative positions of the parts when nothing has been registered on the amount keys, so that the total in each column in the addition must be 0, it will be seen that the sliding block 210 is in contact with an arm 278 of the transfer member 222, which transfer member will not allow the block 210 to move unless some amount is transferred from the next column to the right. Successively making contact are the adding member 174, the block 212, the adding members 176 and 178, the block 214, the adding members 180 and 182, the block 216, the adding member 184 and the projection 272 on the actuator. With the block 210 being held from movement and all of the other parts successively in contact, the actuator cannot move to the left. Under these conditions, which represent the sum of 0 in that column, the numeral wheel for that column is adjusted so that 0 is at the top and will show through the opening in the case.

Referring now to Figure 18a, which shows the relative positions of the various parts of the adding mechanism for this same column when the amounts shown in Example III have been registered on the amount keys and immediately after the carriage 146 has been raised, it will be seen that the block 210 is still in contact with the transfer member 222 and the adding member 174 is still in contact with the block 210, so these parts cannot move. When we come to the block 212, however, it will be seen that it is not in contact with the adding member 174 but, since this adding member is down one step from its top position, the block 212 can move the length of one step to the left before it is stopped by the adding member 174. The adding member 176 is in contact with the block 212 and the adding member 178 is always in contact with the adding member 176, so the two adding members 176 and 178 can also move the length of one step to the left. The block 214 is shown in Figure 18a two steps away from the adding member 178, so it can move the length of two steps, plus the length of one step that 178 can move. Adding member 180 is shown three steps away from the block 214, so this adding member can move the length of three steps, plus three more that the block 214 can move. The adding member 182, being always in contact with the adding member 180, also moves the length of six steps. The block 216 is shown four steps away from the adding member 182, so it can move the length of four steps plus the length of six steps that the adding member 182 can move. The adding member 184 is always in contact with the block 216, so it can also move the length of ten steps. The prong 274 of the actuator 236 is shown nine steps away from the adding member 184, so it can move the length of nine steps plus the length of ten steps which the adding member 184 can move. It is therefore apparent that the actuator, if allowed to move to the left under the influence of the spring, such as 248, can move to the left a distance equal to the length of 19 steps. However, all of the actuators are allowed to move to the left simultaneously, so the other columns have been added at the same time and the next column to the right has a total of 23, so 2 must be transferred to the column shown in Figure 18, this being done by allowing the block 210 to move the length of two steps to the left, by a means to be described later, so all of the other blocks and adding members to the right of this block 210, including the actuator, can move two steps farther than has been recited above. The total travel of the actuator is therefore the length of 21 steps. This causes the rod 264 and the numeral wheel 269 to turn 2.1 revolutions so that the numeral 1 is at the top when the actuator ceases its leftward travel and 2 has been transferred to the next row to the left. Figure 18b shows the various parts after this movement has been completed, while Figure 19b shows a top view of the same parts. In like manner and at the same time, the actuator 236 will have moved the length of the eight steps, so 8 appears on its numeral wheel and nothing is ever transferred from this column to the next one to the left; the actuator 232 will have moved the length of 16 steps, so six appears on its numeral wheel and 1 is transferred to the next column to the left, etc., until the answer of 21213768 appears in the openings in the case and represents the product of 76584 times 277.

Having explained the necessity of transferring certain amounts from one column to the next column to the left, I will now explain how this is accomplished. As has already been explained, when the actuator moves the length of nine steps, its numeral wheel shows 9, but when it moves the length of ten steps, the numeral wheel shows 0, as the total is 10, so the first digit or, in this case, 1, must be added to the next column to the left. This transfer must therefore take place while the numeral wheel is moving from 9 to 0. If it moves from 9 to 0 once, it is necessary to transfer 1, if it moves from 9 to 0 twice, it is necessary to transfer 2, etc., 4 being the most that is ever transferred in the machine which is being described.

The transfer is caused by a cam member which is attached to the bottom of the actuator, and a pivoted transfer member, the movement of which is controlled by the cam member, the transfer member in turn controlling the position of the first sliding block in the next column to the left of the column in which the actuator is located. For example, as best seen in Figures 22 and 22a, the cam 280, which is attached to the actuator 236 by two locating pins 282 and 284 and by a screw 286, has a stepped cam slot 288 through which projects a pin 290 which is attached to an arm 292 of the transfer member 222. This transfer member is pivotally attached to a mounting 294 which is secured to the plate 118. Figure 22 shows the relation of the various parts when the actuator is to the extreme right. The pin 290 is in the end of the cam slot, so it is as low as it will be at any time, which causes the arm 278 and the block 210 to be as far to the right as they will be at any time. Under these conditions, nothing has been transferred from the column in which the actuator 236 is located to the next column to the left, in which the block 210 is located. The five arrows above and to the left of the block 210 show the five positions of the left edge of that block when the amounts of 0, 1, 2, 3 and 4 have been transferred from the column in which the actuator 236 is located. These arrows are solely for reference and are used to show the positions of the block 210 under various conditions. It will be seen that in Figure 22 the left edge of the block 210 is under the arrow marked 0.

The pin will be in the first step of the cam slot 288 until the wheel 296, which is rotated by the actuator 236, has turned to its 9 position. As soon as the wheel starts to turn from the 9 position to the 0 position, the pin starts to ascend from the first step to the second step and it has completed this travel by the time the 0 position of the wheel is reached. In like manner, each time, as the wheel 296 rotates from its 9 position to its 0 position, the pin 290 ascends into the next higher step in the cam slot 288. Thus, when the wheel 296 has passed from 9 to 0 the second time, the pin will be in the position shown in Figure 22a. This will have moved the arm 292 on the transfer member 222 upward and will have moved the arm 278 to the left sufficiently so that the block 210 can move to the left a distance equal to the length of two steps on the adding members. Each change from one step on the cam slot 288 to the next step moves the arm 278 sufficiently to allow the block 210 to move a distance equal to the length of one step, thereby allowing the same movement of the actuator 238 as will one step on any one of the adding members.

Having described the process of adding in this machine, I will now describe the process of restoring the various parts of the adding mechanism to their zero positions, as shown in Figure 18a, in which positions they must be before the next raising of the digit multipliers and the adding members.

From the top of each actuator, such as 238, there rises a projection, such as 297. A retracting bar 298 extends across the adding mechanism and through guide slots in two side rails 300 and 302, as shown in Figure 27, one of the slots 304 in the side rail 300 being shown in Figure 4, while an identical slot, not shown, is in the other side rail 302. At the end of the adding operation, the retractor 298 is forward (to the left) as far as it will go, as viewed in Figure 4, being in the position shown in Figures 18b, 19b and 4. As best seen in Figure 27, both ends of the retractor 298 are moved simultaneously and to the same degree by means of identical links 306 and 308, each of which has one end pivotally attached to one end of the retractor, while the other end is pivotally attached to the identical crank arms 310 and 312, which are secured to a shaft 314 in such manner that their pivot centers are in line. With this construction, as the shaft 314 is rotated, both ends of the retractor 298 must move simultaneously and to the same degree and must move horizontally, since they are guided by the horizontal slots, such as slot 304 in the side rail 300. The means of causing the rotation of the shaft 314 will be described later.

The resetting of all of the parts of the adding mechanism to their zero positions is accomplished by moving the retracting bar 298 as far as it will go toward the rear of the machine (to the right). In its travel from front to rear, the retractor 298 engages the upwardly extending projections, such as 297, on the various actuators, such as 238, moving them to the right until they are in the positions shown in Figures 16, 17, 18, 18a, 19, 20 and 21, compressing the actuator springs, such as 248, as they move to the right. The actuators are held in these positions until the beginning of the next adding operation.

Referring to Figure 19b, it will be seen that there are three projections 316, 318 and 320 extending from the side of the actuator 238. As the actuator 238 is moved to the right by the rectractor 298, these three projections engage respectively a projection 322 on the block 212, projection 324 on the block 214 and projection 326 on the block 216, causing them also to move to the right. The block 214 has a projection 328 which engages a projection 330 on the adding member 176, so as the block 214 moves to the right, it causes the adding member 176 to move to the right which, in turn, moves the adding member 178 to the right. In like manner, the block 216 has a projection 332 which engages a projection 334 on the adding member 180 so that as the block 216 moves to the right, it moves the adding members 180 and 182, as well as the adding member 184, which the block 216 directly engages. The projections on the various parts are so located that when the retractor 298 and the various actuators, such as 238, are at the end of their travel to the right, all of the adding members are to the right as far as they can go, being in contact with the vertical portions of the digit multiplier block guides, such as 160, and the various sliding blocks cannot move endwise in either direction because such movement to the left is prevented by the projections 316, 318 and 320 on the actuator 238, while movement to the right is prevented by engagement with the various adding members. The block 210 is returned to its zero position when the actuator 236 returns to its zero position, since the cam slot 288, acting on the pin 290 of the transfer member 222, forces the block 210 into its zero position, which in turn moves the adding member 174 to the right as far as it will go. Thus, all of the parts of the adding mechanism are positively held in their proper positions, as shown in Figures 16, 17, 18, 18a, 19, 19a, 20 and 21, and will be so held until the retractor 298 moves to the left at the beginning of the next adding operation.

The preceding description has dealt mainly with one column of the adding mechanism, which is the fourth column from the left hand side of the machine, which, in Figure 20, is the fourth column from the top of the figure. As far as the adding mechanism is concerned, the next column to the right is identical. The other columns are necessarily different; but the principles used are the same. Figure 17 shows a side view of the second column from the left, in which, as will be seen by reference to Figure 6, there are two blank spaces at the top, then one digit multiplier block, then another blank space and finally two more digit multiplier blocks. In this case, as will be seen by reference to the top view shown in Figure 20, the actuator 242 has only two projections 336 and 338, corresponding to the projections 316 and 318 on the actuator 238, while the projection corresponding to the projection 320 is absent. It will also be seen that the projection 340, corresponding to the projection 272 on the actuator 238, has been moved to the left sufficiently, as viewed in Figure 17, so that it will engage the first adding member 342 in this column, which corresponds to and is identical with the adding member 184 in the previously described column. Since there is one blank space between the adding member 342 and the next adding member 344, an elongated block 346 is used, which fills the space used in the previously described column by the block 214 and the adding member 178. The parts to the left of the adding member 344 are the same as in the previously described column.

Since the last two columns to the right, which are those at the bottom of Figure 20, have no transfer members, blocks 348 and 350 in these columns are secured to their respective bars 194 and 196, these blocks corresponding to the block 210 in Figure 16. The remaining columns are similarly adapted to the conditions required of them.

Proper alignment of the numeral wheels is obtained, as will now be described.

With all of the digit multiplier blocks and the adding members at their topmost positions, which are their zero positions, the actuator is moved to the left, allowing the various adding members and sliding blocks to successively engage. Since all of the adding members are in their zero positions, their sum must be zero, so the clamping screws for the numeral wheels are loosened, the wheels are turned to 0 and the clamping screws tightened. This compensates for all inaccuracies in the lengths of the sliding blocks and of the zero positions of the adding members. There is, however, the possibility that the positions on the adding members other than the zero position are inaccurate because of the very slight variations that must be allowed in manufacture. The variations are all made so that in no case will the width of the block across the various steps be greater than the theoretically correct dimension, any variation being such as to make the width very slightly less than it should be. Any wear in the sliding blocks or in the adding members will also result in the decreasing of the theoretical dimensions. The reason for the dimensions being kept at the theoretically correct dimension or less is that any aligning to compensate for such inaccuracies can be in one direction only, that direction being the one which will tend to separate the various parts, as it is obvious that if any of the parts are too large, they could not be pushed together to compensate for this inaccuracy, as they are already in contact with one another.

Because there are only a maximum of six adding members in any one column and because these adding members are the only ones whose inaccuracies, when new, are not compensated for by the zero setting of the numeral wheels, there is little chance that the cumulative inaccuracies will be great enough to cause the numeral wheels to be out of line more than a very small fraction of the distance between the correct numeral and the one next to it, but even this small misalignment will make the numeral hard to read and will result in a very unsightly appearance. For this reason, an aligning bar 352, as best shown in Figure 24, is used to assure proper alignment of all of the numeral wheels. This aligning bar 352 has attached thereto eight pins 354, 356, 358, 360, 362, 364, 366 and 368, each one being provided with tapered ends. These pins are directly above the centers of the various numeral wheels, such as 260 and 262. As may best be seen in Figure 23, each of the numeral wheels, such as 260 and 262, has ten holes through it whose centers are in a circle concentric with the wheel itself, these holes being tapered where they enter the rear of the wheel, the angle of the taper being preferably the same as the angle of the taper on the end of the pins, such as 354, in the aligning bar 352. The holes are just slightly larger than the pins so that the pins can enter the holes readily, but without the possibility of appreciable side movement of the pins in the holes. The aligning bar 352 is so placed that the distance between the centers of the numeral wheels, such as 260, and the centers of the pins, such as 362, is the same as the distance from the centers of the wheels to the holes in them. This being the case, if the numeral wheels are correctly aligned with any desired numerals at the top, the pins can freely enter the holes in the wheels and the aligning bar will be in the position in relation to the wheels which is shown in Figure 24, which is the position of the bar at the end of the adding operation and when the machine comes to rest at the end of its operation. During the adding operation and during the resetting of the adding mechanism, the aligning bar 352 is in the position shown in Figure 18a, with all of its pins withdrawn from the holes in the numeral wheels, allowing the wheels to turn freely. If, at the end of the adding operation, any of the numeral wheels are slightly misaligned, when the aligning bar 352 is moved forward, the tapered ends of the pins, engaging the tapered holes in the wheels, will force the wheels into proper alignment.

If some of the numeral wheels, such as 260, are supposed to be at 9 at the end of the adding operation and they partially overtravel, due to inaccuracies or wear in the parts, a partial transfer would be caused, which should not occur. The extreme case of this condition would be if the sum at the end of the adding operation contained a series of 9's, such as 999,999 when overtravel of the last numeral wheel would tend to change this to 1,000,000 were it not for the fact that this column has no transfer. As it is, overtravel of the next to the last numeral wheel will tend to change the 999,999 to 1,000,000. For this reason, the length of the pins 356, 358, 360, 362, 364, 366 and 368 in the aligning bar 352, are graduated. As the bar 352 moves forward, the pins 354 and 356, being the same length, first align the numeral wheels which they enter, then successively, the pins 358, 360, 362, 364, 366 and 368 align the numeral wheels which they enter. This successive alignment of the numeral wheels corrects any partial transfer before the next wheel to the left is aligned.

As previously explained, there is little likelihood in a new machine that the cumulative inaccuracies of the adding members will cause the numeral wheels to be out of line more than a very small fraction of the distance between the correct numeral and the next one to it, in which case, the aligning bar 352 can easily force the wheels into proper alignment. There is a possibility, however, that in time, wear will increase the cumulative inaccuracies to such an extent that the aligning bar 352 can no longer do this. For this reason, a second aligning member 370 is provided. Referring to Figure 21, it will be seen that the sliding block 214 has an upwardly projecting boss 372, the top of which is serrated. As will be seen in Figure 20, the corresponding sliding blocks on four of the other columns of adding mechanism have similar serrated bosses. If these sliding blocks are properly aligned, any inaccuracies due to the transfer mechanism and the sliding blocks between the transfer mechanism and the aligned blocks will be corrected, so that the aligning bar 352 need only correct any inaccuracies between the aligned sliding blocks, such as 214, and the numeral wheels, such as 260. Because there is no transfer mechanism affecting the two columns to the extreme right and because there are so few other parts involved, and because there are so few parts involved in the last column to the left, it is not considered necessary that this second aligning member 370 align any parts in these columns. The aligning member 370 has five rows of serrations, such as 374, as best shown in Figures 27 and 29, each of which is in the line of travel of the serrated boss, such as 372, on one of the sliding blocks. The serrations on the bosses and on the aligning member are so formed that the spacing of the teeth is the same as the length of one step of the adding members and the aligning member 370 is so positioned that, when the sliding blocks are in their proper positions, the serrations on the aligning member 370 will match the serrations on the sliding blocks, such as 214. During such times as the sliding blocks may be moving, the aligning member 370 is held in a raised position so that the blocks, such as 214, are free to move, but immediately after the adding operation is completed, this aligning member 370 is lowered and, if any of the sliding blocks, such as 214, is not in its proper position, the lowering of the aligning member 370 will force it into alignment, after which the numeral wheels, such as 260, will be so nearly in correct alignment that the aligning bar 352 can force them into line.

The movements of the aligning member 370 and of the aligning bar 352 are controlled in a manner which I will now describe.

The aligning member 370 has secured thereto four studs 376, 378, 380 and 382. The studs 376 and 378 project through camming slots 384 and 386 in the operating member 388 and also through slots 390 and 392 in the side rail 300, as best shown in Figure 4, which slots allow vertical movement of the studs 376 and 378, but no movement toward the front or the rear of the machine. The studs 380 and 382 project through identical camming slots in an operating member 394, which is identical to operating member 388, and through slots identical to the slots 390 and 392 in the side rail 302. The operating member 388 is guided by two studs 396 and 398 which are secured to the side rail 300 and which project through the horizontal portion of the camming slot 384 and through a horizontal slot 400 respectively, thereby allowing only horizontal movement of the operating member 388. The operating member 394 is guided in identical manner by two studs 402 and 404 which are secured to the side rail 302. Two identical links 406 and 408 are pivotally attached to the operating members 388 and 394 respectively, by means of studs 407 and 409, the other ends of these links being pivotally attached to identical arms 410 and 412 respectively. The arms 410 and 412 are secured to a shaft 414 in such manner that the pivot centers of the two arms are in line. With this construction, it is apparent that rotation of the shaft 414 will cause the two operating members 388 and 394 to move simultaneously and to the same degree. The means of rotating the shaft 414 will be described later.

The aligning bar 352 is secured to two bosses 416 and 418 on the operating members 388 and 394 respectively so that these three parts move as a unit. As shown in Figures 27, 28 and 29, both the aligning bar 352 and the aligning member 370 are disengaged from the parts which they align, as they must be when any parts of the adding mechanism are moving, and the operating members 388 and 394 are as far toward the rear of the machine as they can go. Under these conditions, the shaft, as viewed in Figure 28, is rotated clockwise as far as it will go. As the shaft 414 is rotated counterclockwise, through the arms 410 and 412 and the links 406 and 408, the operating members 388 and 394 are caused to move to the left. As soon as this movement to the left begins, the sloping portion of the camming slots 384 and 386 in the operating member 388 and of the corresponding camming slots in the operating member 394 cause the aligning member 370 to lower and to align the sliding blocks, such as 214. During this portion of the travel none of the pins, such as 354, have entered the aligning holes in the numeral wheels, because the aligning bar is initially far enough away from the numeral wheels to prevent this. After the aligning member 370 has ceased its downward travel, the pins in the aligning bar 352 start to enter the aligning holes in the numeral wheels, starting with the two pins 354 and 356, which enter their respective numeral wheels simultaneously, after which the pins 358, 360, 362, 364, 366 and 368 successively align their respective numeral wheels.

When setting the various numeral wheels, such as 260, to zero, as previously described, it is best to loosen the clamping screws which secure the numeral wheels to their respective rods, turn all of the wheels to "0," engage the aligning bar 352 so as to hold the numeral wheels accurately in place, allow the actuators to move toward the front of the machine as far as the adding members, when in the zero positions, will allow them to go and then tighten the clamping screws which secure the various numeral wheels to their respective rods. After this has been done, each actuator which causes a transfer to the next column to the left, should be allowed to move forward until its respective numeral wheel is at "9" and the numeral wheels held in this position by the aligning bar 352, after which each screw, such as 286, which holds a cam, such as 280, in place, as best shown in Figure 22, should be loosened and the cam adjusted endwise until it is as far to the left as it can go without causing any movement of the transfer member, such as 222, after which the screw, such as 286 should be tightened. With this adjustment, as soon as the numeral wheel in any column started to move from "9" to "0," the cam on the actuator in that column will start to move the transfer member. The pins, such as 282 and 284, which are secured to each actuator, and which project through slots in the cams, such as 280, keep the cams in their proper vertical positions.

*The keyboard mechanism*

Figure 31 shows a side view of one of the keybanks, with its connections to the shaft which operates it, and to the selector mechanism. While this Figure 31 shows the last keybank to the right, or row H, as shown in Figure 1, it could be any of the keybanks from D to H inclusive and, excepting that the connection to the selector mechanism is different in the case of the multiplier keybanks A, B and C, it could represent one of these latter keybanks, the connection of which to the selector mechanism is shown in Figure 43. The relation of some of the parts may be better understood by referring to Figures 37 and 41, which show portions of all of the keybanks in their relative positions.

To simplify the designation of parts in Figures 37 and 41, where like parts occur in several or all of the keybanks, I have given such like parts the same designating number, adding the suffix "a" if the part is a portion of, or is operated by, keybank "A," "b" for keybank "B," etc. In Figures 43, 43a, 43b and 43c, where these parts can represent the corresponding parts in all of the keybanks, I have omitted the suffix letters. Thus the links 592a, 592b and 592c, as shown in Figure 41, being all alike, are represented in Figures 31, 43, 43a, 43b and 43c by the designation 592.

In the keybank itself, 420 is a channel shaped frame, secured at one end to a cross bar 422 and at the other end to a cross bar 424, these cross bars being in turn secured to the side rails 300 and 302. Slidably supported by the frame 420 are ten "amount" keys, 426 and 428-1 to 428-9 inclusive. The key 426, which is the "0" key, is different from the others in that it is only used when one of the other keys in that row, 428-1 to 428-9 inclusive, is depressed and the operator wishes to release it so that the row will record 0 when the machine is operated. Each of the amount keys has a stem 430, a top 432 and a cap 434 and is pushed upwardly by a compression spring 436. These parts are best shown in Figure 32. The stem 430 has an arm 438 and a projection 440. This projection 440 can be omitted from the "0" key 426, since it serves no useful purpose on that key; but, if it is desired to make all of the stems the same, the projection will do no harm. Otherwise, all of the keys are the same with the exception of the number which will be printed on the top of the cap 434. Each key stem, such as 430, extends through a slot in an upper flange 442 of the frame 420 and through a slot in a lower flange 444 of the same frame 420. The stem 430 is closely guided by the slot in the lower flange 444 but, for the purposes of assembly, the slot in the upper flange 442 must be made somewhat longer than the width of the stem 430. A locating disc 446, which has a slot which closely guides the stem 430, also has a projection 448 which extends downward into the slot in the flange 442 and thereby holds the stem 430 in the proper position in the slot. The compression spring 436, pressing downward on the disc 446, keeps the projection 448 in the slot and also exerts an upward pressure on the key. The arm 438 on each stem 430 is shaped as best shown in Figures 33 and 34, each side of the lower edge being sloped as shown.

A detent 452 and eight interlocks 454 are slidably mounted between the flanges 442 and 444 of the frame 420 and between the key stems 430 and the side 456 of the frame 420. A tension spring 458, extending between the detent 452 and a projection 460 on the frame 420, exerts a force on the detent 452 which keeps the detent as far forward (to the left) as the arms 438 will allow it to go. The detent 452 has a sloping portion 462 which contacts a sloping lower edge of the arm 438-0 excepting when the detent is retracted for releasing any depressed key or when one of the amount keys 428-1 to 428-9 inclusive, is partially depressed. The detent 452 also has nine sloping portions such as 464, which are similar to the sloping 462 but not as long, one of these sloping portions 464 being in the position shown in Figure 33 in relation to each of the arms 438-1 to 438-9 inclusive, on the amount keys 428-1 to 428-9 inclusive. Immediately below the end of each sloping portion 464 is a projection 466 which extends substantially in the line of travel of the arm 438 but with the lower end slightly to the right of the upper end, as shown in Figure 33. Next to the portion 466 is a shoulder 468 at right angles to the line of travel of the arm 438 and below that is a portion 470 which is directly in the line of travel of the arm 438 and so placed that, when the detent 452 is in its normal forward position as shown, the portion 470 is in line with the rear side 472 of the arm 438. With the detent made as above described, when any amount key 428-1 to 428-9 inclusive, is pressed downward, the arm 438, engaging the sloping portion 464 of the detent, causes the detent to move to the right far enough so that the arm 438 can pass the point between the portions 464 and 466. Further downward movement of the key does not cause any further movement of the detent until the top edge 474 of the arm 438 passes the point between the portions 464 and 466 of the detent, after which the detent will move very slightly to the left until the edge of the top 474 of the arm 438 passes the edge 468, when the detent will move to the left until its portion 470 comes in contact with the rear side 472 of the arm 438 of the depressed key. When the depressed key is no longer held down by the operator, the edge 468, engaging the top 474 of the arm 438, will prevent the key from rising under the force of the spring 436, so that it will remain depressed. Figure 33 shows the arm 438-2 held down by the detent, so the key 428-2 will remain depressed. If, when one of the amount keys is thus being held in its depressed position, another amount key, 428-1 to 428-9 inclusive, is fully depressed, the downward movement of the latter key causes the detent to move to the right sufficiently so that the arm 438 of the key which was previously depressed no longer engages the edge 468 of the detent 452, thereby allowing the previously depressed key to move to its uppermost position and the last depressed key will remain depressed. The slight incline of the portion 462 of the detent 452 causes the edge of the detent between the portions 468 and 466 to travel slightly farther to the right than is necessary in order to release the arm 438, thereby insuring the releasing of the previously depressed key in spite of any slight inaccuracies in the detent, the key stem or the mounting of the keys. In this way, if an incorrect key has been depressed in any row, depressing the correct key in the same row will make the correction. If, when one of the amount keys is held in the depressed position, the "0" key 426 is pressed by the operator, the lower edge of its arm 438-0 will engage the sloping portion 462 of the detent and cause the detent to move to the right, thereby releasing the depressed amount key, but the key 426 will return to its uppermost position as soon as the operator ceases to press it, as there is nothing to hold it down. This being the case, if a key is being held in its depressed position and it is desired that no key be depressed in that row, pressing the "0" key will release the depressed key and it will itself return to its uppermost position.

All depressed keys in all of the rows of the multiplicand (rows D, E, F, G and H) can be released simultaneously by a counter-clockwise rotation of a release bar 476, as viewed in Figure 40, which bar 476 is mounted on a shaft 480, as best shown in Figure 37. In the same way, a release bar 478, mounted on the same shaft 480 simultaneously releases all depressed keys in the multiplier rows (rows A, B and C) if it rotates in the same direction. These release bars cause the release of the amount keys because surfaces 482 on the release bars 476 and 478 engage projections 484 on the various detents 452, as best shown in Figure 31, the release bar 476 engaging the detents in rows D, E, F, G and H and the release bar 478 engaging the detents in rows A, B, and C. Thus, the counter-clockwise rotation of the release bar 476 will cause the detents in rows D, E, F, G and H to move to the right, thereby releasing any depressed keys in these rows, while the same rotation of the release bar 478 will cause the detents in rows A, B, and C to move to the rear, thereby releasing any depressed keys in these rows. As may best be seen in Figure 40, the release bar 476 can be caused to rotate in a counter-clockwise direction by pressing downward on the "Error" key 106. This key 106 is slidably mounted between the lower flange 444 of the frame 420 and a unitary cover plate 486, which cover plate is secured to certain of the keybank frames 420, being held in spaced relation to the frame by spacers, such as 488 shown in Figure 31. The "Error" key 106 has a stem 490 which extends through closely fitting slots in the flange 444 and in the cover 486, as shown in Figure 40. The key 106 is normally held upward by a compression spring 492 so that the edge 494 of the stem 490 contacts the under side of the cover 486. When the key 106 is pressed downward, an edge 496 of the stem 490 engages a surface 498 of the release bar 476 and further downward movement of the key 106 causes the release bar 476 to rotate counter-clockwise, as shown in Figure 40, thus retracting the detents in rows D, E, F, G and H and thereby releasing any depressed keys in these rows. The "Error" key 104 acts in like manner on the release bar 478 through a stem 490a on the key 104, thereby releasing any depressed keys in rows A, B and C.

As best seen in Figure 37, the shaft 480, upon which the release bars 476 and 478 are mounted, is pivotally mounted between the upright ends 500 and 502 of the cross bar 424, with a crank 503 secured to one end of the shaft and a collar 504 secured to the other end, preventing endwise motion of the shaft 480. To the shaft 480 are also secured two actuating collars 506 and 506a. Each of these identical collars has a prong 508 extending a short distance lengthwise of the shaft 480. The release bars 476 and 478 can move lengthwise of the shaft 480. When either of these bars is moved to the left until its end is in contact with the collar 506 or 506a, then the projecting prong 508 of that collar overlaps the end of the release bar, whereas, when the release bar is moved slightly to the right, the prong 508 does not overlap the release bar. In Figure 37, the release bar 476 is shown moved to the left so that its end is in contact with the collar 506a and the prong 508 overlaps the release bar, while the release bar 478 is moved to the right so that it is entirely free from the collar 506. When either release bar is moved to the left, its surface 498 is directly below and in line with the lower edge of the prong 508, as best shown in Figure 38. With this arrangement, the release bar 476 or 478, as the case may be, is free to move counter-clockwise, as viewed in Figure 38, under the action of the "Error" key 104 or 106 and it will also be rotated counter-clockwise by the counter-clockwise rotation of the shaft 480. At a certain point in the cycle of operation of the machine, this shaft is rotated counter-clockwise. If, at that time, the release bars 476 and 478 are moved to the left, all depressed amount keys will be released, while if either release bar is moved to the right, any depressed amount keys in the rows controlled by that release bar will remain depressed and, unless subsequently changed by the operator, will cause the same amount to be used in the next operation of the machine. In this way, either the multiplicand or the multiplier, or both, can be repeated. The movement of the release bar 476 is effected by means of the "Repeat" key 102 and the movement of the release bar 478 is effected by means of the "Repeat" key 100, both of which "Repeat" keys are constructed the same and act in the same manner, as shown in Figure 39. The "Repeat" key 102 has a stem 510 which passes through a slot in the cover 486 and extends downward through a notch in the extended portion of the release bar 476. The stem 510 also passes through a slot in a leaf spring 512, whose curved ends 514 and 516 bear against the under side of the cover 486. A pin 518, passing through the stem 510 and under the spring 512 causes a surface 520 of the key 102 to bear against the top surface of the cover 486, holding the key 102 in its proper position, while the friction of the surface 520 on the top surface of the cover 486 and the curved ends 514 and 516 of the spring 512 on the lower surface of this same cover tend to keep the key from unintentionally sliding in the slot in the cover 486. This unintentional sliding of the key is further prevented by means of a protrusion 522 in the cover 486. When the key 102 is as far to the left as it can go, either because of the length of the slot in the cover 486 or because the release bar is in contact with the collar 506a, the curved end 514 of the spring 512 is to the left of the protrusion 522, as shown in Figure 39. In order for the key 102 to move to the right, it is necessary that the curved end 514 of the spring 512 be forced downward against the upward tendency of the spring. When the key 102 has been moved as far to the right as the slot in the cover 486 will permit, the curved end 514 of the spring 512 is to the right of the protrusion 522. Thus the key is prevented from moving from either end position unless it is so moved by the operator.

To prevent malfunction of the machine, it is necessary to provide means which will prevent any of the amount keys to be either depressed or released during a certain portion of the operating cycle. As best seen in Figure 31, for this purpose a shaft 523, upon which are secured locking fingers such as 525 in line with the end 485 of each detent, such as 452, is pivotally mounted between the upright ends 500 and 502 shown in Figure 37 of the cross bar 424, with a crank 527 secured to one end of the shaft and a collar 529 secured to the other end of the shaft. Figure 31 shows the shaft 523 and the fingers 525 rotated counter-clockwise to the full extent of their travel so that the various locking fingers, such as 525, are behind the ends of the various detents, such as the end 485 of the detent 452, and make it impossible for the detent to move to the right, which in turn makes it impossible to either depress or release any of the amount keys 426.

It is also necessary, in order to prevent malfunction of the machine, to provide means which will make it impossible to have two amount keys, such as 428-1 and 428-2, in the same row, fully depressed or nearly so, at the same time, but it is desired that one amount key, such as 428-1 can be depressed sufficiently to release another fully depressed key, such as 428-2. For this purpose, as clearly shown in Figure 34, eight interlocks 454 are provided, one between each two amount keys 428, but not including the "0" key 426. If any one amount key, such as 428-2, is depressed, its arm 438-2, as shown in Figure 34, acting on the sloping surfaces 455 and 455a, forces the two interlocks 454 and 454a to separate to such an extent that the sloping surface 455b allows only a limited movement of the arm 438-1, while the sloping surface 455c allows only limited motion of the arm 438-3 and the corresponding sloping surfaces on the remaining interlocks allow only limited motion of the other arms 438. The limited motion allowed is sufficient to release the previously depressed key, but not enough to cause malfunction.

As best seen by referring to Figures 31, 32 and 36, two keybank slides 524 and 526 are slidably mounted to the under side of the frame 420 by means of two brackets 528 and 530 and two studs 532 and 534. These studs 532 and 534 extend through elongated slots in both of the slides 524 and 526, these slots being shown in the slide 526 at 536 and 538, the slots in the slide 524 being in the same relative positions. These slots permit a certain amount of endwise movement of the slides. The slide 524 has nine projections 540-1 to 540-9 inclusive, extending from its upper edge, while the slide 526 has nine projections 542-1 to 542-9 inclusive extending from its upper edge. These two slides 524 and 526 are directly beneath the lower edge 544 of the stem 430 on each of the amount keys 428-1 to 428-9 inclusive, and the projections 540-1 to 540-9 and 542-1 to 542-9, both inclusive, are so located in reference to the edges 544 of the amount keys that when any amount key is in its uppermost position or is in the first part of its downward travel, these projections will pass freely under that key, whereas if the amount key is fully depressed, the edge 544 on that amount key will not allow any of the projections to pass under it and will therefore arrest the movement of the slides 524 and 526 at the point where one of these projections engages the edge 544 of the depressed amount key. Assuming that the total lengthwise movement of the slide 524 is divided into nine equal spaces, the position of the projection 540-1 on the slide 524 is such that, if the amount key 428-1 is depressed, the slide 524 can move to the left from its extreme right position a distance of approximately one space; if the amount key 428-2 is depressed, the projection 540-2 will allow the slide 524 to move a distance of approximately two spaces to the left from its extreme right position; with the amount key 428-3 depressed, projection 540-3 allows a movement of approximately three spaces, etc., until when the amount key 428-9 is depressed, the slide 524 can move the full nine spaces before projection 540 will engage the amount key. The projections 542-1 to 542-9 inclusive on the slide 526 are also so placed that projection 542-1 engages the amount key 428-1 when the latter is depressed, projection 542-2 engages the amount key 428-2, etc., but in this case the spacing of the projections is in approximately the reverse order from the spacing of the projections on the slide 524. When the amount key 428-9 is depressed, it immediately engages the projection 542-9 so that the slide 526 is arrested from any movement to the left. Again dividing the total possible movement of the slide 526 into nine equal spaces, when the amount key 428-8 is depressed, the slide 526 can move to the left approximately one space before the projection 542-8 engages the edge 544 of the depressed amount key, when the amount key 428-7 is depressed, projection 542-7 allows the movement of approximately two spaces, etc., until when the amount key 428-1 is depressed, the projection 542-1 will allow the slide 526 to move approximately eight spaces. If no amount key is depressed in that row, the slide will not be arrested by any of the projections and will be free to move the entire nine spaces, its total travel being limited by the length of the slots 536 and 538. Note that the spacing of the projections on the two slides is approximately one space, two spaces, etc., rather than being exactly these amounts. This is necessary for reasons which will be explained later.

In case no amount key is depressed in any given keybank, means must be provided which will prevent any movement to the left of the slide 524, as viewed in Figures 31 and 36. To accomplish this, I have provided a zero stop bar 546 which is pivotally mounted to the frame 420 by means of two brackets 548 and 550 and two studs 552 and 554. A torsion spring 556, one end of which passes through a slot 557 in the stud 554, which stud moves with the bar, and the other end of which engages the stationary bracket 548, tends to rotate the bar 546 in a clockwise direction, looking from the front end, as in Figure 32. When thus rotated to the full extent of its travel, a prong 558, shown in Figure 36, projects across the end 560 of the slide 524 and prevents any movement of that slide to the left. The bar 546 has an upwardly projecting flange 562 which is directly beneath a projecting end 564, shown in Figure 32, on each amount key, such as 428-1. If all of the amount keys in any given keybank are in their uppermost positions, the projecting ends 564 of these keys will all clear the flange 562 on the bar 546, as shown in Figure 32, so that the prong 558 will remain in front of the slide 524 and prevent its movement. If, however, any one of the amount keys, 428-1 to 428-9 inclusive, is depressed, the projecting end 564 of that key will force the flange 562 downward, thereby rotating the bar 546 in a counter-clockwise direction sufficiently so that the prong 558 will no longer arrest the motion of the slide 524. As soon as the depressed amount key is released, which is after the slide has been returned to the extreme right, the torsion spring 556 will rotate the bar 546 clockwise, as viewed in Figure 32, until the prong is again in front of the slide 524. In case of any tendency to stick, this clockwise rotation is forced to take place by a cam 566, best shown in Figure 35, which is integral with the detent 452 and which engages an arm 568 on the bar 546 after the detent has moved far enough to the right to release the depressed amount key, forcing the bar 546 into its proper position. This movement of the bar 546 will also force the amount key upward if it tends to stick.

The forward and backward movement of the slides 524 and 526 is caused by the rotation of a shaft 570 to which are secured eight arms, such as 572, one for each keybank. A link 574, best shown in Figure 43, is pivotally connected to the arm 572 by a stud 576 and to another link 580 by a stud 578. The link 580 is pivotally connected to the slide 524 by a stud 582 and to another link 584 by a stud 586. The link 584 is also pivotally connected by a stud 588 to an arm 590 which projects downwardly from the slide 526. These parts and their relative positions are best shown in Figure 43, which shows the parts for one of the keybanks in the multiplier, but as far as the above described parts are concerned, the parts are the same for all keybanks. In Figure 43 the various parts are shown in the positions which they will assume when an operation of the machine has been completed and the machine is at rest. Under these conditions, the shaft 570 is rotated counter-clockwise, as viewed in Figure 43, to the full extent of its travel, thereby having retracted the slides 524 and 526 as far as they will go to the right. Figure 43a shows the same parts when the shaft 570 has been rotated clockwise to the full extent of its travel and none of the amount keys 428 are depressed. As best seen in Figure 36, with no amount key depressed, the prong 558 on the zero stop bar 546 prevents any forward movement of the slide 524, so the slide 526 is forced forward to the full extent of its travel. Figure 43b shows the shaft 570 in the same position as in Figure 43a but in this case the amount key 428-7 is depressed so that its stem 430-7 is in the position shown. With the stem 430-7 in the position shown, as the shaft 570 rotates clockwise, the slide 524 can move forward only until its projection 540-7 engages the stem 430-7 and the slide 526 can move forward only until its projection 542-7 engages the stem 430-7, the projections on the two slides being so located that they will both be in contact with the key stem when the shaft 570 is rotated completely clockwise. The same is true of all of the pairs of projections on the slides 524 and 526. The locations of the projections 540-1 to 540-9 on the slide 524 are determined by other requirements which are described later and the projections 542-1 to 542-9 on the slide 526 are so located that when the shaft 570 is rotated clockwise to its full extent, the projections 540-1 and 542-1 will engage the stem 430-1, 540-2 and 542-2 will engage the stem 430-2, etc. With this arrangement, the slide 524 is positively located in a definite place every time the machine is operated.

Pivotally attached to the slide 524 by the stud 582 is a link 592 which is identical to the link 580. The center of this link 592 is connected to an arm 594 by a link 596 which is pivotally attached to the arm 594 by a stud 598 and to the link 592 by a stud 600. The arm 594 is mounted on the shaft 570 and is free to turn on that shaft. The length of the arm 594 is the same as the length of the arm 572 and the link 596 is identical with the link 574 so that, in case the center of the stud 598 coincides with the center of the stud 576, the links 580 and 592 will be directly in line and the centers of the studs 586 will coincide with the center of the stud in the lower end of the link 592. These conditions exist whenever the shaft 570 is rotated clockwise to the full extent of its travel, due to the fact that a prong 602, which is a part of the arm 572, extends across the arm 594 and is so formed that when the prong 602 is in contact with the arm 594, the centers of the studs 576 and 598 coincide. In all cases, when the arm 572 is rotated its entire distance in a clockwise direction, the prong 602 is in contact with the arm 594 and a stop 604 on the arm 594 is against a protruding section 606 of the cross bar 424, preventing any further rotation in a clockwise direction of the arm 594. In Figures 43a and 43b these conditions exist, as well as under certain other conditions, as will become evident later.

The links, such as 592, on the various keybanks are connected to the mechanism which moves the digit multiplier selectors 122 into their proper positions.

*Moving the selectors*

As has been previously explained, the digit multiplier selectors are moved longitudinally of the machine (from front to back) by the movement of the frames upon which they are mounted which, in turn, are caused to move by the multiplier keybanks A, B and C, and these same selectors are caused to move transversely of the machine by the multiplicand keybanks D, E, F, G and H. While certain of the figures herewith show the connection between all of the keybanks and the selector shifting mechanism and will be described later, I will first take one digit multiplier selector and show what means are used for shifting it both longitudinally and transversely.

For the purpose of illustrating the shifting of one selector, I have chosen the selector 122ag in Figure 30 and have shown it, together with its mountings and shifting means. The longitudinal shifting of this selector 122ag is caused by the multiplier keybank A, while its transverse shifting is caused by the multiplicand keybank G. I will first describe the longitudinal shifting of this selector.

Referring to Figure 30, 592a is the link on the keybank A which is actuated as previously described and which is connected to the mechanism which moves the selectors 122ad, 122ae, 122af, 122ag and 122ah, all of which are mounted on the frame 136a. For simplification, only the one selector 122ag is shown in Figure 30. As shown in Figure 30, the link 592a is in its forwardmost position, which is the position which it assumes when no key is depressed in the keybank A, so that this digit of the multiplier equals 0. The link 592a, as well as all of the other parts which are controlled by this link, are therefore in their "0" positions, as shown in Figure 30. If one of the keys in keybank A had been depressed, the center of the stud 616a would have been moved to the rear, the amount, determined by the depressed key, being indicated by the scale which has been drawn in Figure 30 under the center of the stud 616a.

The link 592a is pivotally connected by the stud 616a to a link 620 which is in turn pivotally connected to an arm 612a, which is secured to a shaft 614a. The shaft 614a is pivotally mounted between the stationary side rails 300 and 302, as best shown in Figures 5 and 41. One end of the shaft 614a is mounted an arm 624a, while on the other end of the same shaft is mounted another arm 626a. Pivotally attached to the arm 624a is a link 628a, while an identical link 630a is pivotally attached to the arm 626a. The other ends of the links 628a and 630a are pivotally attached to identical bellcranks 632a and 634a respectively. These two bellcranks are pivotally attached to the stationary plate 118 by studs 636a and 638a respectively. The two arms 624a and 628a are so secured to the shaft 614a that their pivot centers for the links 628a and 630a are in line. To the lower arms of the two bellcranks 632a and 634a are attached two studs 640a and 642a, which project through vertical slots 644a and 646a in the frame end pieces 132a and 134a, respectively. With this arrangement of parts, rotation of the shaft 614a uniformly moves the two ends of the frame 136a on its guide rods 138 and 140. Similar systems of linkage connect the link 592b on the keybank B to the selector frame 136b and the link 592c on the keybank C to the selector frame 136c.

I will now describe the transverse shifting of the selector 122ag, as caused by the multiplicand keybank G.

Referring to Figure 30, 592g is the link on the keybank G which is actuated as previously described and which is connected to the mechanism which moves the selectors 122ag, 122bg and 122cg. For simplification, only the one selector 122ag is shown in Figure 30.

As shown in Figure 30, the link 592g is in its forwardmost position, the same as in the link 592a, meaning that no key is depressed in the keybank G, so that this digit of the multiplicand is 0. This being the case, all of the linkage and mechanism connected to the link 592g is shown in the "0" position. As was described previously in connection with the link 592a, the lower pivot 648g of the link 592g will assume the positions shown by the scale beneath it after the various keys in the keybank G are depressed.

A link 650g is connected by means of a ball and socket joint 652g to the link 592g and by means of another ball and socket joint 654g to an arm 656g, which is secured to a vertically mounted shaft 658g, which is pivotally mounted between the stationary plate 120 and the supporting member 188, as best shown in Figure 4. Secured to the shaft 658g is an arm 660g, to which is pivotally connected a link 662g, the other end of which is pivotally connected to an arm 664g of a bellcrank 665g, the arm 664g being the same length as the arm 660g. Another arm 666g is at right angles to the arm 664g. This bellcrank 665g is pivotally mounted to a bracket 668, best shown in Figures 4 and 15, by a stud 670g.

Another arm 672g is secured to the shaft 658g at right angles to the arm 660g. The length of the link 662g is such that, when the shaft 658g is so rotated that the arm 672g is parallel to the longitudinal axis of the machine, the arm 666g is also parallel to the same axis. A link 674g is pivotally connected to the arm 666g and to a selector locating slide 676g. Another link 678g is pivotally connected to the arm 672g and to the slide 676g. As best shown in Figures 4 and 15, the slide 676g, as well as the other slides 676d, 676e, 676f and 676h are all slidably mounted on the machine base 680, the slides 676f, 676g and 676h being held in place by three studs 682, 684 and 686, which project through slots 688, 690 and 692 respectively in the three slides.

With the arrangement of parts as described, as the shaft 658g is rotated, rotating the arm 672g, the arm 666g is caused to rotate by substantially the same amount, but in the opposite direction, so that the two ends of the slide 676g are moved simultaneously and by substantially the same amount. While the linkage is such that the two ends of the slide 676g will not move exactly by the same amounts, the difference is so very small as to be of no consequence.

Referring again to Figure 30, it will be seen that the locating slide 676g has three similar upwardly projecting slotted members 694ag, 694bg and 649cg. The slotted member 594ag engages a tongue 696ag, shown in Figure 15, on the selector 122ag, the two prongs of the slotted member 694ag engaging the two sides of the tongue 696ag in such manner that the tongue can readily slide in the slot, but with a minimum of lost motion between the tongue and the slot. In the same way, the slotted members 694bg and 694cg engage the selectors 122bg and 122cg (not shown in Figure 30, but shown in Figure 15). It is evident that with this arrangement of parts, when the lower end of the link 592g moves from the position shown in Figure 30 toward the rear, turning the shaft 658g clockwise, the locating slide 676g will be moved transversely of the machine to the left, causing the selector 122ag (and also the selectors 122bg and 122cg, not shown in Figure 30) to move to the left, the amount of movement depending upon the amount of movement of the link 592g, which in turn depends upon which key is depressed in the keybank G.

The tongue 696ag is of such length that the slotted member 694ag will properly engage it regardless of the position of the selector 122ag, which may be in different positions depending upon which key has been pressed in the keybank A. Shifting of the selector 122ag will take place both longitudinally, if a key is depressed in the keybank A, and transversely, if a key is depressed in the keybank G, at the same time so that the resulting movement of the selector may be diagonal rather than either longitudinal or transverse. The slots in the upwardly extending members, such as 694ag, are long enough to allow the carriage 146 to raise and lower the full extent of its travel without this member 694ag disengaging the tongue 696ag. Figure 30 shows the carriage at the top of its travel, which is its position when the machine is at the end of its travel.

The foregoing description of Figure 30 explains how one of the selectors is moved into its proper position as determined by the keys which have been depressed in the two keybanks which control it. The action is similar for all of the other selectors. Keybank B has a link 592b, shown in Figure 41, which is connected to an arm 612b on a shaft 614b by means of a link 622. By means of a linkage almost identical with that described in connection with Figure 30 and employing exactly the same principles, the rotation of the shaft 614b causes the movement of the selector frame 136b. In the same way, the keybank C has a link 592c, shown in Figure 41, which is connected to an arm 612c on a shaft 614c by means of a link 610 and linkage similar to that used in connection with the shaft 614b causes the selector frame 136c to move longitudinally when the shaft 614c is turned.

As previously mentioned, there are five selector locating slides 676d, 676e, 676f, 676g and 676h, one for each of the keybanks D, E, F, G and H. These are best shown in Figure 15. The locating slide 676d is controlled by the keybank D and moves the selectors 122ad, 122bd and 122cd; a locating slide 676e is controlled by the keybank E and moves the selectors 122ae, 122be and 122ce; a locating slide 676f is controlled by the keybank F and moves the selectors 122af, 122bf and 122cf; as already described in connection with Figure 30, the locating slide 676g is controlled by the keybank G and moves the selectors 122ag, 122bg and 122cg; and a locating slide 676h is controlled by the keybank H and moves the selectors 122ah, 122bh and 122ch. As best seen in Figure 15, the locating slides 676d and 676e are mounted on the machine base 680 by means of studs 698, 700 and 702, which project through slots 704, 706 and 708 respectively, these slots being in both of the locating slides 676d and 676e. The locating slide 676d lies on the locating slide 676e which, in turn, lies on suitable bosses on the machine base 680. Likewise, the locating slide 676h lies on the locating slide 676f which, in turn, lies on the locating slide 676g and this, in turn, lies on suitable bosses on the machine base 680. Each of these slides moves the three selectors which it controls, in the same way that the slide 676g moves the selector 122ag, as described in connection with Figure 30.

Each of the selector locating slides 676 is controlled by one of the multiplicand keybanks D, E, F, G and H in the same manner as was described in connection with Figure 30 for the keybank G. The keybank D causes the shaft 658d to turn which, through linkage including an arm 660d connected by a link 662d to another arm 664d and arms 672d and 666d, connected by links 678d and 674d to the locating slide 676d, all of which parts correspond to the like numbered parts described in connection with Figure 30, cause the locating slide 676d to move in the same manner that the corresponding parts caused the locating slide 676g to move as previously described. Corresponding parts with like numbers connect the keybanks E, F and H to the locating slides 676e, 676f and 676h respectively and cause them to move.

For proper operation of the machine it is necessary that the selectors be locked into position after they have been moved to their proper positions. This is necessary because the numeral wheels, such as 260, must show the amount of the product when the machine ends its cycle of operation, requiring that the adding mechanism shall not be reset to zero at the end of the operation, which necessitates that the digit multiplier blocks and the selectors be in their raised positions. It is obvious that the selectors, such as 122ag, cannot be shifted while in this position, so, to prevent any possibility of such movement being attempted when the keybank slides 524 and 526 are retracted, which must be done before the end of the cycle, the shifting mechanism is locked in place before the keybank slides are retracted and are held thus until the selectors have been lowered so that they are out of engagement with the digit multiplier blocks. The locking mechanism also acts to properly locate the shifting mechanism and to take up any lost motion motion which may exist between the keybanks and the shafts to which they are connected.

Referring to Figure 30, it will be seen that the arm 626a which is secured to the right hand end of the shaft 614a, has a notched segment 710a. Referring to Figure 4, it will be seen that there are similar notched segments on the arms 626b and 626c, which are attached to the shafts 614b and 614c respectively. A locking member 712, best shown in Figures 4 and 5, is slidably mounted on the side rail 300 by means of the studs 714 and 716, which pass through slots 718 and 720 in the locking member 712. This locking member 712 has three tapered edged projections 722a, 722b and 722c which engage the notches in the notched segments 710a, 710b and 710c respectively of the arms 626a, 626b and 626c when the locking member is in its rearward position as shown in Figure 4. There are ten notches in each segment and they are so located that, when the tapered projections, such as 722a, are in the various notches, the selectors will be properly aligned with the various horizontal rows of spaces on the digit multiplier blocks, such as AG-1 and AG-10. The locking member 712 therefore both locks the selector frames, such as 136a, in position and centers them properly. While the shafts are being moved, the locking member 712 is at the forward end of its travel so that its projections 722a, 722b and 722c do not interfere with the movement of the segments 710a, 710b and 710c. The slots in the locking member are so sloped that the direction of travel of the projections 722a, 722b and 722c is directly toward or away from the centers of the shafts 614a, 614b and 614c respectively.

In order to lock and to locate the locating slides which are operated by the keybanks D, E, F, G and H, as best shown in Figures 25 and 26 each of the shafts 658d, 658e, 658f, 658g and 658h has a notched segment secured to its upper end. In order that all of the segments can have their full required travel without interfering with each other, it is necessary to place them in two planes, as shown in Figure 26. As shown in Figure 25, segments 724d, 724f and 724h are identical and have ball and socket studs 726d, 726f and 726h secured directly to them. Likewise, the segments 724e and 724g are identical and, as far as the notches are concerned, are identical to the segments 724d, 724f and 724h, but on the shafts on which the segments 724e and 724g are mounted, it is necessary to provide separate arms 728e and 728g, to which the ball and socket studs 726e and 726g are secured.

Each of the notched segments 724d, 724e, 724f, 724g and 724h has ten notches. A locking member 730 is pivotally mounted between the two side rails 300 and 302 by means of studs 732 and 734, as best shown in Figures 4 and 5. A flange 736 on the locking member 730, as shown in Figure 25, is so formed that a portion of it will be in the same plane as each of the notched segments, such as 724d. This flange has a tapered projection, such as 738d, directly in line with the center of each shaft, such as 658d, and of a shape to properly engage the notches in the segments, as shown in Figure 25. Figure 4 also shows the locking member 730 engaging these various segments. The notches are so located in the segments that, when the projections, such as 738d, are fully entered in the notches, the selectors 122 are in their proper positions in relation to the vertical columns of spaces on the digit multipliers, such as AG-1 and AG-10. Thus, the locking member 730 serves both to lock the selectors in position and to properly locate them. When the shafts, such as 658d, are being turned, the flange is rotated forward sufficiently to permit free movement of the segments.

The locking member 730 is pivotally attached to a link 740 by a stud 742, the other end of the link 740 being pivotally attached to the locking member 712 by a stud 744, so that the two locking members move simultaneously. The means of moving them will be described later.

Having thus described the mechanism which connects the slides, such as 524, of the various keybanks to their respective portions of the selector shifters, I will explain the action of the parts shown in Figure 43 under various conditions.

In order that the amount of the product will show on the numeral wheels, such as 260, after the machine has completed its operation, the digit multipliers, such as AD, AE, etc., must still be in their raised positions, which means that the selectors 122 must still be in the positions necessary for obtaining the desired product. In other words, the multiplying mechanism cannot be cleared at the end of the machine's operation. It is therefore necessary that the mechanism which is connected to the arm 594 of each keybank must remain, at the end of the operation of the machine, in the position which it was required to assume during the operation of the machine in order to properly locate the selectors. On the other hand, it is necessary that the amount keys 428 be released at the end of the operation and that the mechanism be so positioned that they can be depressed for the next operation. This requires that the slides 524 and 526 be retracted to their full extent at the end of the operation of the machine. It is for this reason that there are two arms on the shaft 570 for each keybank. The arm 572, which is secured to the shaft, is connected to the slides 524 and 526 so that when the shaft 570 is rotated counter-clockwise to the full extent of its travel, as shown in Figure 43, the slides 524 and 526 are fully retracted. On the other hand, the selector actuating mechanism, which is connected to the link 592 in each keybank, is operated by the arm 594, which is not secured to the shaft 570, but is free to remain in its previous position when the shaft 570 rotates to the position shown in Figure 43. Figure 43a shows the positions of the various parts when the machine is in that portion of its cycle of operation when the shaft 570 is rotated clockwise to its full extent and when no amount key has been depressed in the row shown. Under these conditions, the slide 524 has been prevented from any movement by the prong 556 on the zero stop bar 546 and the slide 526 has been forced forward to the full extent of its travel. Since the stud 582 in the slide 524 has not moved, the forward movement of the arm 594, motivated by the prong 602 on the arm 572, causes the shaft 614 to rotate counterclockwise to the full extent of its travel, which in turn causes the selectors which are controlled by the shaft 614 to move to their "0" positions. While the various parts are still in the positions shown in Figure 43a, the two locking members 712 and 730, which have been disengaged from the notched segments, such as 710 and 724, now engage these notched segments, locking them in position. As soon as this is done, the shaft 570 can be again rotated counterclockwise to the full extent of its travel, leaving the various parts in the positions shown in Figure 43. If the "7" key 428-7 is depressed, then, when the shaft 570 is rotated clockwise, the slide 526 will be forced forward by the arm 572, the link 574 and the link 580 until the projection 542-7 on the slide 526 engages the stem 430-7 of the key 428-7, after which further movement of the arm 572, the link 574 and the link 580 force the slide 524 forward until the projection 543-7 on the slide 524 also engages the stem 430-7 of the key 528-7, as shown in Figure 43b. Each of the projections, such as 542-7, on the slide 526, is so located on that slide that both it and the corresponding projection, such as 548-7, on the slide 524, engage the stem, such as 430-7, when the shaft 570 reaches the end of its rotation in a clockwise direction, thus insuring that the slide 524, which controls the location of the selectors, is in the proper position to cause the selectors to be moved to their proper positions. The stop 604 on the arm 594, which engages the protruding section 606 of the cross bar 424, prevents any overtravel of the arm 594 and of the parts connected thereto. When the shaft is again rotated counter-clockwise to the full extent of its travel, the various parts will be in the positions shown in Figure 43c. It will be seen that the arm 594 has returned part way. The amount which it returns during each operation depends upon the amount key which is depressed during that operation of the machine. As shown in Figure 43, the arm 594 does not return at all when no amount key is depressed; on the other hand, if the "9" key is depressed, the arm 594 will return all the way. Unless the "9" key has been depressed on the previous operation, the prong 602 on the arm 572 will not be in contact with the arm 594 when the arm 572 starts its movement in a clockwise direction, but it will pick up the arm 572 somewhere during its travel, unless no amount key has been depressed for two operations in succession, in which case the arm 594 will remain in its extreme clockwise position, and the arm 572 will move the arm 594 the remaining distance. With this arrangement of parts and motions, it will be seen that the selectors are not returned to their "0" positions during each operation of the machine, but are moved directly from positions which they occupied during one operation to the positions which they must occupy for the succeeding operation.

Operating mechanism

Having thus described the component parts of my invention, I will now describe the means which are used to connect the operating handle to the various parts which must be moved in order to perform a multiplication after the proper amount keys have been depressed.

When the machine is at rest after the completion of an operation or, in other words, when it is at its "0" position in the operating cycle, the following conditions exist:

1. The keyboard is unlocked. This requires that the shaft 523 be rotated clockwise so that the locking fingers 525 are in such a position that the detents 452 are free to move.

2. The amount keys have been released unless one or both of the "Repeat" keys has been moved to the right. This releasing requires that the shaft 480 shall have been rotated counter-clockwise and then returned to its original position.

3. The keybank slides 524 and 526 are retracted. This requires that the shaft 570 be rotated counter-clockwise to its full extent. These three conditions thus far recited leave the keyboard in the proper condition to permit the depressing of the amount keys for the next operation.

4. The selector carriage 146 is in its uppermost position. This is necessary in order that the digit multiplier blocks will be raised and thereby allow the amount of the product to be added and to show on the row of numerals 110 through the openings in the case 112.

5. The locking members 712 and 730 are in such positions as to engage the notched segments 710 and 724, thereby locking the selector shifting mechanism.

6. The aligning bar 352 and the aligning member 370 are in their aligning positions, which requires that the shaft 414 be rotated counter-clockwise to the full extent of its travel.

7. The adding member retracting bar 298 is forward to the full extent of its travel, so that the adding mechanism can be in the adding condition.

Starting with the "0" position as described above, the proper operation of the machine requires that the various parts of the mechanism be moved in the following order:

1. Disengage the adding mechanism aligning members.
2. Move the adding member retracting bar to the rear.
3. Lower the selector carriage.
4. Disengage the selector locking members.
5. Lock the keyboard. This can be done at any time in the cycle up to this point.
6. Advance the keyboard slides, thereby relocating the selectors.
7. Engage the selector locking members. (The reverse of #4.)
8. Retract the keyboard slides. (The reverse of #6.)
9. Unlock the keyboard. (The reverse of #5.)
10. Release the depressed keys.
11. Raise the selector carriage. (The reverse of #3.)
12. Move the adding member retracting bar forward. (The reverse of #2.)
13. Engage the adding mechanism aligning members. (The reverse of #1.)

Excepting the locking and the unlocking of the selectors (#4 and #7 above) and the releasing of the depresed keys (#10 above), it will be noticed that the motions in the second half of the cycle (Nos. 8, 9, 11, 12 and 13) are exactly the reverse of those in the first half of the cycle (Nos. 6, 5, 3, 2 and 1 respectively). Since the handle is moved forward and then back to its original position, providing a reversal of motion, it is possible to combine this reversal of motion of the handle with the reversals of action of the various parts, as described above, in quite a simple manner, treating the releasing of the keys and the unlocking and locking of the selectors independently.

Referring to Figures 3, 44 and 45, an operating cam member 750 is pivotally mounted by means of a boss 752 to an upright 754. This upright 754 is attached to the machine base 680 by means of screws 756. Another upright 758 is attached to the machine base 680 in a similar manner. The operating handle 108 is attached to the cam member 750 by means of a screw 760, two prongs 762 on the handle fitting into corresponding slots in the boss 752 so that the two members will turn as a unit. In order to facilitate the return of the operating handle 108 and the cam member 750 after the handle has been pulled forward by the operator, a tension spring 764, as best shown in Figure 3, is mounted between a stationary boss 766 on the machine base 680, to which boss the spring is pivotally attached, and a boss 768 on the cam member 750, to which the spring is also pivotally attached. The tension of this spring is sufficient to cause the cam member and the handle to return without the necessity of the operator applying any force on the handle.

On the outer side of the cam member 750 are two cams in the form of slots 770 and 772. A roller 774, which is guided by the two sides of the cam slot 770, is pivotally attached to an arm 776. This arm 776 is pivotally attached to the upright 754 by means of a stud 778. To the other end of the arm 776 is pivotally attached a link 780 which is also pivotally attached to the crank 527 which is secured to the shaft 523. With this arrangement of parts, when the cam is in its "0" position, as shown in Figure 45, the shaft 523 is rotated clockwise to the full extent of its travel and the locking fingers 525 are in such positions that the detents 452 are free to move, but when the cam member 750 is rotated counterclockwise sufficiently so that the roller 774 enters the section 770a of the cam slot 770, the arm 776 is caused to rotate clockwise, which causes the shaft 523 to rotate counter-clockwise sufficiently so that the locking fingers 525 prevent any movement of the detents 452.

A roller 782, which is guided by the two sides of the cam slot 772, is pivotally attached to an arm 784. This arm 784 is pivotally attached to the upright 754 by means of a stud 786. A link 788 is pivotally attached to the other end of the arm 784 and also to a crank 790 on the shaft 570. When the cam member 750 is in its "0" position and the parts are as shown in Figure 45, the shaft 570 is rotated counterclockwise to the full extent of its travel and the keybank slides 524 and 526 are fully retracted. As soon as the cam member 750 has rotated counter-clockwise sufficiently so that the arm 776 has completed its clockwise rotation, the roller 782 enters a portion of the cam slot 772 which starts clockwise rotation of the arm 784 and consequently of the shaft 570 and this clockwise rotation continues until the roller 782 enters the portion 772a of the cam slot 772, after which no further rotation of the arm 784 and of the shaft 570 takes place. When in this latter position, all of the keybank slides 524 and 526 are forward to the full extent which the depressed amount keys will allow and the selectors have been forced into the positions necessary for the current operation of the machine.

As best shown in Figure 48, on the inner side of the cam member 750 there are three other cams in the forms of slots 792, 794 and 796. A roller 798, which is guided by the two sides of the cam slot 792, is pivotally attached to an arm 800, which in turn is pivotally attached to the upright 758 by means of a stud 802. To the upper end of the arm 800 is pivotally attached a link 804, the other end of which is pivotally attached to the alignment operating member 388 by the stud 407, as shown in Figures 27, 28 and 29, to which is also pivotally attached the link 406, as previously explained. When the cam member 750 is in its "0" position, as shown in Figure 48, the arm 800 is rotated counter-clockwise to the full extent of its travel and the operating member 388 is forward to the full extent of its travel, which necessitates that the operating member 394 is also forward, because of the linkage, including links 406 and 408, arms 410 and 412 and the shaft 414, which cause both operating members 388 and 394 to move simultaneously and to the same degree. The aligning bar 352 and the aligning member 370 are therefore in aligning positions. As soon as the cam member 750 starts rotating counter-clockwise, the cam slot 792 starts to rotate the arm 800 in a clockwise direction and this rotation continues until the roller 798 is in the outer section 792a of the cam slot 792, at which time the alignment operating members 388 and 394 are all the way to the rear and the aligning bar 352 and the aligning member 370 are disengaged from the parts which they align, so that the various parts of the adding mechanism are free to move.

A roller 806, which is guided by the two sides of the cam slot 794, is pivotally attached to an arm 808, which is attached to a shaft 810. The shaft 810 passes through the upright 758, being pivotally mounted therein, and has an arm 812 secured to its outer end. A link 814 has one end pivotally attached to the arm 812 and the other end pivotally attached to the arm 310. As previously explained, the arm 310 is secured to one end of the shaft 314, to the other end of which is secured the arm 312, these two arms 310 and 312, through the links 306 and 308 moving the adding mechanism retractor 298. When the cam member 750 is in its "0" position, as shown in Figure 48, the arms 808 and 812, with their connecting shaft 810, as well as the arms 310 and 312 and their connecting shaft, 314, shown in Figure 3, are all rotated counter-clockwise to their full extent, so the retractor 298 is fully forward, as shown in Figure 19b. As the cam member 750 is rotated counter-clockwise and as soon as the roller 798 has ceased to rotate the arm 800, the roller 806 starts to move the arm 808, causing its shaft 810 and the shaft 314 to rotate clockwise, thereby moving the retractor 298 to the rear, as shown in Figures 18 and 19, thereby restoring all of the parts of the adding mechanism to their "0" positions.

A roller 816 is pivotally attached to an arm 818, which is pivotally attached to the upright 758 by means of a stud 820. A link 822 has one end pivotally attached to the arm 818 and the other end pivotally attached to a bellcrank 824. This bellcrank 824 is pivotally attached to a flange 826 of the plate 120, as best shown in Figure 4, while an identical bellcrank 828, not shown, is similarly pivotally attached to a flange on the other side of the plate 120, its pivot center being directly in line with the pivot center of the bellcrank 824. Two other bellcranks 829 and 830 (the latter not shown) are secured to the two ends of a shaft 832 in such a manner that their various pivot centers are in line. The shaft 832 is pivotally mounted between the flange 826 on the plate 120 and the corresponding flange on the other side of the plate, not shown. A link 834 has one end pivotally attached to the bellcrank 824 and the other end pivotally attached to the bellcrank 828. Another identical link 836, not shown, is pivotally attached to the bellcranks 829 and 830. The links 834 and 836 have a length between pivot points which is the same as the distance between the points where the bellcranks 824 and 829 are pivotally attached to the flange 826 of the plate 120, with the result that lines between the pivot centers of the four bellcranks and the other corresponding pivot centers are always parallel. Pivotally attached to each of the four bellcranks 824, 828, 829 and 830, is a link, such as 838 attached to the bellcrank 824 and 840 attached to the bellcrank 829, as shown in Figure 4 and 842 and 844 attached respectively to the bellcranks 828 and 830. The other ends of these four links 838, 840, 842 and 844 are pivotally attached to the four corners of the carriage 146, as best shown in Figure 15. Since all four bellcranks move uniformly, their movement will cause the four corners of the carriage to rise or lower simultaneously and to the same degree, thus moving all of the digit multiplier selectors uniformly. When the cam member 750 is in its "0" position, as shown in Figure 48, the carriage 146 is raised to the full extent of its travel and remains in that position until the cam member has rotated counter-clockwise sufficiently so that the retractor 298 has ceased its rearward movement, when the arm 818 starts to rotate clockwise, causing all of the bellcranks 824, 828, 829 and 830 to rotate clockwise and thereby lower the carriage 146 and the digit multiplier selectors 122. It is immediately after these parts have stopped moving that the arm 776 and the keyboard lock start moving, as previously described.

Mounted between the uprights 754 and 758 is a pivot 846 upon which are mounted a lever 848 and a cam follower 850, as best shown in Figures 45 and 46. To the cam follower 850 is secured a stud 852 which extends past the side of the lever 848 and which carries on its outer end a tension spring 854, the other end of which is carried by a stud 856, which is secured to the lever 848. Unless otherwise prevented, the spring 854 keeps the cam follower 850 in such a position in relation to the lever 848 that the stud 852 is in contact with the edge of the lever 848, as shown in Figures 45 and 46. When the stud 852 is thus in contact with the edge of the lever 848, any clockwise rotation of the cam follower 850 will cause a similar rotation of the lever 848, but the cam follower 850 can rotate counter-clockwise without the lever 848 necessarily following it. Pivotally attached to the lever 848 is a link 858, the other end of which is pivotally connected to the locking member 712. When the cam member 750 is in its "0" position, as shown in Figure 45, the lever 848 and the cam follower 850 are in the positions shown and are held in these positions by a tension spring 860, which is mounted between the stud 744 on the locking member 712 and a stationary stud 862 which is secured to the side rail 300, as best shown in Figure 4. When the lever 848 is in this position, the locking members 712 and 730 are in their locking positions so that the selectors cannot move horizontally. The locking members will remain in their locking positions until the cam member is rotated counter-clockwise sufficiently so that a projection 864 on the cam follower 850 is engaged by a sloping surface 866 on the periphery of the cam member 750, after which further movement of the cam member in a counter-clockwise direction causes the cam follower 850 to rotate clockwise about the pivot 846 and, since the stud 852 is against the side of the lever 848, the lever is also caused to rotate clockwise, thereby causing the locking members 712 and 730 to move out of their locking positions so that the selector shifting mechanism is free to move. The locking members will remain in their unlocked positions as long as the projection 864 is in contact with a circular surface 868 and until the projection 864 passes a point 870, after which the cam follower 850 and the lever 848 can again rotate counter-clockwise to their original positions under the influence of the spring 860, thereby returning the locking members 712 and 730 to their locking positions. In case the spring 860 does not immediately return the locking members 712 and 730 to their locking positions, a projection 872 on the cam member 750, which projection extends across the plane of the lever 848, will engage the edge of the lever 848 and force it to rotate counter-clockwise to its original position, in which case the locking members 712 and 730 will be in their locking positions. When the operator releases the operating handle 108 and allows the cam member 750 to return to its "0" position, the position 870 on the periphery of the cam member 750 engages the projection 864 on the cam follower 850, causing the cam follower to rotate counter-clockwise about its pivot 846 but, since the locking members 712 and 730 are already in their locking positions, the lever 848 cannot rotate any farther in a counterclockwise direction, so the stud 852 leaves its contact with the edge of the lever 848, causing the spring 854 to be extended, as shown in Figure 47. As soon as the projection 864 on the cam follower 850 reaches the sloping surface 866, the cam follower 850 starts to rotate in a clockwise direction under the influence of the spring 854 and continues this clockwise rotation until the stud 852 is again in contact with the edge of the lever 848. In case the cam follower 850 does not properly return to this position, a projection 874 on the cam member 750 forces it into its proper position so that the various parts are again in the positions shown in Figure 45.

As best shown in Figure 48, a second lever 876 and a second cam follower 878 are also mounted on the pivot 846. Secured to the cam follower 878 is a stud 880 which extends across the plane of the lever 876 so that this stud can contact the edge of this lever. The outer end of the stud 880 carries a tension spring 882, the other end of which is carried by a stud 884 which is secured to the lever 876. A link 886 is pivotally attached to the lever 876 and to the crank 503 on the key-release shaft 480. When the cam member 750 is in its "0" position, as shown in Fig. 48, the lever 876 and the shaft 480 are rotated clockwise to the full extent of their travel, due to the force exerted on all of the detents 452 by the springs 458 and also because the lever 876 is held in that position because its edge 888 is in contact with a raised portion 890 of the periphery of the cam member 750. When the shaft 480 is thus rotated clockwise to the full extent of its travel, the various detents 452 can move freely. As the cam member 750 is rotated counter-clockwise, the cam follower 878 and the lever 876 remain in the positions shown in Figure 48 until a projection 892 on the periphery of the cam member 750 engages a projection 894 on the cam follower 878, when further counter-clockwise rotation of the cam member 750 causes clockwise rotation of the cam follower 878. Since the lever 876 is already at its extreme clockwise position, it cannot rotate with the cam follower, so it remains in its previous position and the stud 880 leaves its contact with the edge of the lever 876, causing extension of the spring 882. As soon as the projection 892 on the periphery of the cam member 750 has passed the projection 894 on the cam follower 878, the cam follower is again free to rotate counter-clockwise under the influence of the tension spring 882 until the stud 880 is again in contact with the edge of the lever 876, the same as when the cam member was in its "0" position as shown in Figure 48. In case the cam follower does not return freely under the influence of the spring 882, it will be forced into the proper position by a surface 896 on the cam member 750. While the cam follower 878 has moved during the counter-clockwise rotation of the cam member 750, the lever 876 and the shaft 480 have not moved, nor will they move during the first part of the return, or clockwise rotation of the cam member 750, since the raised portion 890a of the periphery of the cam member 750, contacting the edge 888 of the lever 876, holds that lever in position. When the cam member 750 has rotated clockwise sufficiently so that the projection 894 on the cam follower 878 is engaged by a surface 898 which leads to the projection 892 on the periphery of the cam member 750, then further clockwise rotation of the cam member 750 causes the cam follower 878 to rotate counter-clockwise about its pivot 846 and, since the stud 880 is in contact with the edge of the lever 876, this lever and the shaft 480 are also rotated counter-clockwise, as shown in Figure 49, causing all of the detents 452, unless prevented by the "Repeat" keys 100 or 102, to move to the rear sufficiently to release the amount keys 423 and to cause the zero stop bar 546 to return to its proper position. As soon as the projection 892 on the periphery of the cam member 750 has passed the projection 894 on the cam follower 878, this cam follower, the lever 876 and the shaft 480 can all again rotate clockwise under the influence of the detent springs 458. If these springs do not return these parts to the positions shown in Figure 48, they will be forced into these positions when the edge 888 of the lever 876 engages a sloping surface 900 on the periphery of the cam member 750.

In order to insure proper action of the machine, it is necessary that the handle 108 be pulled forward sufficiently so that the cam member 750 rotates counter-clockwise to the full extent of its travel or very close thereto before the rotation of the cam member 750 is reversed. Likewise, it is necessary that the cam member be allowed to return fully to its "0" position or very close thereto before the handle is again pulled forward. This complete, or very nearly complete travel in both directions is assured by means of a ball 902, best shown in Figures 44 and 45, which is held in contact with the circular surface 904 on the cam member 750 and the upper flat surface of a platform 906 which is integral with the upright 754, by means of a projection 908 on an arm 910 which is pivotally mounted on the upright 754 by means of a stud 912. The surface 904 is concentric with the boss 752 of the cam member 750. When the cam member 750 is in its "0" position, as shown in Figure 45, the projection 908 on the arm 910 continuously exerts pressure to the right on the ball 902, due to the fact that a stud 914, which is secured to the arm 910, engages a sloping surface 916 of an arm 918, which is pivotally attached by means of a stud 920 to the upright 754, and a tension spring 922, which is attached to the arm 918 and to a stud 924 on the upright 754, tends to rotate the arm 918 clockwise so that the arm 910 also tends to rotate clockwise due to the pressure of the surface 916 on the stud 914. With the ball 902 thus held against the surfaces 904 and 906, which are very slightly sloping in relation to each other at the points where the ball makes contact, any clockwise rotation of the cam member 750 will cause the ball 902 to wedge between the surfaces 904 and 906, thereby preventing any counter-clockwise rotation of the cam member 750. This condition continues to exist until the cam member 750 has been rotated sufficiently so that a stud 926, which is secured to the cam member 750, engages the edge of the arm 910 and forces the arm 910 to rotate in a counter-clockwise direction with the cam member 750. This counter-clockwise rotation of the arm 910 causes the stud 914 thereon, acting on the surface 916 of the arm 918, to force the arm 918 to rotate in a counter-clockwise direction sufficiently so that the stud 914 can pass over the point between the surface 916 and another surface 928 on the arm 918. This counter-clockwise rotation of the arm 918 causes an extension of the spring 922 and as soon as the stud 914 passes over the point between the surfaces 916 and 928, the tension of the spring 922 will cause the arm 918 to rotate clockwise and the sloping surface 928, acting on the stud 914, will keep the arm 910 rotated counter-clockwise as far as it will go, which is the position when a second projection 930 on the arm 910 forces the ball 902 into contact with the surfaces 904 and 906, the ball now being in a position to the left of a vertical center-line through the pivot center of the cam member 750, instead of to the right, as shown in Figure 45. The stud 926 is so located on the cam member 750 that the ball 902 will be forced into its last described position just as the cam member has reached the end of its counter-clockwise rotation. With the ball 902 in this position, clockwise rotation of the cam member 750 is possible, but, if the operator attempts to pull forward on the operating handle 108, which would cause counter-clockwise rotation of the cam member 750, the ball 902 will be wedged between the surfaces 904 and 906 and prevent this counter-clockwise rotation until a stud 932, which is secured to the cam member 750, engages the edge of the arm 910 and again forces it into the position shown in Figure 45, this last action taking place just as the cam member 750 reaches its "0" position. Thus, this mechanism forces the operator to pull the handle all the way forward before it will return and it must be allowed to fully return before it is again pulled forward, thereby assuring proper functioning of the cam system.

Summarizing, the sequence of operation of the various parts of the machine is as follows: After the operator has depressed the desired amount keys, the operating handle is pulled forward and during the forward stroke of the handle, first, the adding members are unlocked by disengaging the aligners, which is necessary before the adding mechanism can be restored to its "0" position, then the adding mechanism retractor is moved to the rear, retracting all of the actuators and resetting all of the adding mechanism parts to their "0" positions, after which the selector carriage is lowered, allowing the adding members and the digit multipliers to lower or, if they do not lower of their own accord, forcing them to lower by means of the plate above the digit multiplier blocks which is secured to the carriage and moves with it. As soon as the selector carriage is fully lowered, the selector shifting mechanism is unlocked so that the selectors can be moved to their new positions. At this same time the keyboard is locked so that from this time on until no harm can be done thereby, the amount keys can neither be depressed nor released. This locking of the keyboard is permissible at any time up to this part of the cycle, but must not be done later than this. Next, the keybank slides are advanced, the positions which each pair on each keybank assumes being determined by the amount key which has been depressed in that keybank. This advancing of the keybank slides forces the selectors into the proper positions, both longitudinally and transversely, for the current operation. When this advancing of the keybank slides has been completed, the selector shifting mechanism is locked, this operation also properly centering the selectors. At this point, the handle has reached the end of its forward movement. As it starts to return, first, the keybank slides are retracted, but without moving the selectors from their previously assumed positions, since they are locked in place. Next, the keyboard is unlocked and then the keys are released, unless the release is prevented by the position of one or both of the "Repeat" keys. This unlocking and releasing of the keys can be at any time from this point on, but must not be before the keyboard slides are fully retracted. Starting simultaneously with the releasing of the keys, the selector carriage is raised, the selectors causing the digit multiplier blocks and the adding members to rise various amounts according to the amount keys which have been depressed. Next the adding mechanism retractor is moved forward, allowing the adding member actuators to move forward and cause adding to take place, the numeral wheels finally showing the sum of all the amounts set up on the adding members by the digit multiplier blocks, which is the product of the two numbers, the amount keys for which were depressed before the operation of the machine was started. Finally, the aligning members for the adding mechanism are engaged so as to assure that the correct numerals are shown for the product and that these numerals will be properly centered in the openings in the case through which they are read. Thus, at the end of the return movement of the handle, the product appears in the openings in the front of the case and the machine is ready for the next problem without the necessity of clearing the machine between multiplying operations.

In the device disclosed herein, the selectors are adjustably mounted with respect to the digit blocks. Within the purview of this invention, the digit blocks could be adjusted so as to select the proper position with respect to an actuating mechanism for actuating the totalizers. Furthermore, the unit block and the tenths block could then be so arranged as to be moved together. As a matter of fact, instead of using two blocks, one block could be used, which block could then contain the data now found on the two blocks.

Although the movements of the selectors have been referred to as movements in three planes and as straight line movements, it can be readily seen that by simultaneously depressing a key in the multiplier keybank and a key in the multiplicand keybank, the selectors may move along a diagonal line. In other words, the selectors could then be referred to as having an angular movement and a radial movement.

The mechanism shown herein has been used to illustrate the process of partial product multiplication and summation. Within the purview of this invention the mechanism may be altered, rearranged or changed to carry out the same method.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a multiplying machine of the partial product type, a plurality of means for determining the amounts of the various partial products, each of said means consisting of two members, one for the first digit of the partial product and one for the second digit of the partial product, each of said members having one hundred selectable positions arranged in ten rows with ten positions in each row, a set of adjustable keys for recording the amount of the multiplicand, another set of adjustable keys for recording the amount of the multiplier, selecting means including a selector for each pair of members, each selector having a selecting means for each member of the aforesaid pair of members, which selecting means can be so moved as to select any one of the one hundred selectable positions on said member, means controlled by one set of adjustable keys for moving said selecting means longitudinally of said member, means controlled by the other set of adjustable keys for moving said selecting means transversely of said member, means for raising the aforesaid selectors which in turn raise the aforesaid members by various amounts depending upon which one of the one hundred selectable positions has been selected on each member, means for adding simultaneously more than two amounts, said means including stepped horizontally sliding means for each digit to be added, each of which stepped sliding means is connected to one of the aforesaid members, and other non-stepped horizontally sliding means for limiting the amount of movement of the stepped sliding means, each of said stepped sliding means being movable vertically into any one of several positions by the raising of the aforesaid member to which it is connected for the purpose of determining the amount which that stepped sliding means shall cause to be added, a plurality of means, one for each column of digits to be added, for horizontally actuating the sliding means, and means controlled by said actuating means for showing the total of the various amounts which have been added.

2. In a partial product multiplying machine adapted for the concurrent formation of the partial products of two multi-digit factors; a multi-order keyboard for the multiplicand and the multiplier, respectively; a plurality of multiplier units each comprising a pair of horizontally disposed partial product blocks respectively representing the units and tens of partial products by 100 steps of graded depth disposed as a rectangular grid of 10 columns and 10 rows representing respectively the digits 0–9 of each factor; a selector cooperable with each block pair, each said selector being associated with a bank of digit keys of the multiplier keyboard and a bank of digit keys of the multiplicand keyboard; means for shifting each selector in one horizontal direction a distance determined by a selected digit key of the multiplier; means for shifting each selector in a horizontal direction normal to the first direction a distance determined by a selected digit key of the multiplicand, to thereby coordinately select a product representing step on each block pair; and means to move said selectors an invariable distance toward the blocks in a direction normal to the plane of the selecting movements, whereby each selector will engage the coordinately selected steps of its associate block pair and adjustably displace said blocks a distance representative of the selected partial products.

3. In a partial product multiplying machine adapted for the concurrent formation of the partial products of two multi-digit factors; a multi-order keyboard for the multiplicand and multiplier respectively; a plurality of multiplier units each comprising a pair of laterally disposed partial product blocks respectively representing the units and tens of partial products by 100 steps of graded depth in one face of each block, said steps being disposed in a rectangular grid of 10 columns and ten rows representing respectively the digits 0–9 of each factor; a selector cooperable with both blocks of each block pair, each said selector being associated with a bank of digit keys of the multiplier keyboard and a bank of digit keys of the multiplicand keyboard; means for shifting each selector in one direction transversely of the stepped faces of the pair of blocks a distance determined by a selected digit key of the multiplier keyboard; means for shifting each selector in a second direction transversely of the stepped faces of the pair of blocks and normal to the first direction a distance determined by a selected digit key of the multiplicand keyboard, to thereby coordinately select a product representing step on each block of a pair of blocks; and means to move said selectors an invariable distance toward the blocks in a direction normal to the plane of the selecting movements, whereby each selector will engage the coordinately selected steps of its associate block pair and adjustably displace said blocks distances representative of the selected partial products.

4. In a partial product multiplying machine adapted for the concurrent formation of the partial products of two multi-digit factors; factor indexing means including multi-order control members for the multiplicand and the multiplier respectively; a plurality of multiplier units each comprising a pair of horizontally disposed partial product blocks representing respectively the units and the tens of partial products by 100 steps of graded depth disposed as a rectangular grid of 10 columns and 10 rows representing respectively the digits 0–9 of each factor; a selector cooperable with each block pair, each said selector having two vertically extending prongs for engaging the two blocks of each block pair and being associated with a control member of the multiplier indexing means and a control member of the multiplicand indexing means; means for shifting each selector in one horizontal direction a distance determined by the positioning of a control member of the indexing means of the multiplier; means for shifting each selector in a horizontal direction normal to the first direction a distance determined by the positioning of a control member of the indexing means of the multiplicand, to thereby coordinately select product representing steps on the two blocks of each block pair; and means to move said selectors an invariable distance toward the blocks in a direction normal to the plane of the selecting movements, whereby each two-pronged selector will engage the coordinately selected steps of the two blocks of its block pair and adjustably displace said blocks distances representative of the two digits of each selected partial product.

5. In a partial product multiplying machine according to claim 4 wherein the amount each block is displaced is determined by the depth of the step contacted by a vertical prong of its selector.

6. In a partial product multiplying machine having means settable concurrently to represent the partial products of two multi-digit factors, a plurality of adding members, one for each of the product representing means, each of said adding members being provided with surfaces in a stepped arrangement representing amounts to be added and being movable vertically by said product representing means so as to determine the amount to be added by said adding member, and means for moving the several stepped adding members horizontally so as to engage a predetermined step of each adding member for totalizing the partial products as determined by the product representing means.

7. In a partial product multiplying machine having means settable concurrently to represent the partial products of two multi-digit factors, a plurality of adding members, one for each of the product representing means, each of said adding members being provided with surfaces in a stepped arrangement representing amounts to be added and being movable vertically by said product representing means so as to determine the amount to be added by said adding member and totalizing mechanism including a horizontally reciprocatory member and a rotatable member having a spiral groove, said reciprocatory member moving into contact with a step of one of the adding members which in turn causes other adding members to move into contact with each other to thereby cause the rotatable member to rotate for totalizing the product.

8. In a partial product multiplying machine having means settable concurrently to represent the partial products of two multi-digit factors, a plurality of adding members, one for each of the product representing means, each of said adding members being provided with ten surfaces representing amounts to be added from 0-9 in stepped arrangement, said adding members being movable vertically by their respective product representing means into any one of ten positions so as to make any one of the ten stepped surfaces effective and so determine the amount to be added, and totalizing means including a horizontally reciprocatory member and a rotary member having a spiral groove drivingly connected to the reciprocatory member, and a totalizing wheel driven by the rotary member so that as the reciprocatory member is moved into contact with a predetermined step of one of the adding members which in turn causes other adding members to move various distances depending upon the degree to which each has been moved vertically by its product representing means until said adding members contact other adding members the product is totalized and the amount indicated on the totalizing wheel.

9. In a partial product multiplying machine according to claim 8 wherein a centering means is provided for accurately locating the totalizing wheel after the wheel has been rotated to totalize the product.

DONALD H. REEVES.

References Cited in the file of this patent

UNITED STATES PATENTS

| Number | Name | Date |
|---|---|---|
| 207,918 | Verea | Sept. 10, 1878 |
| 556,720 | Bollee | Mar. 17, 1896 |
| 647,238 | Shattuck | Apr. 10, 1900 |
| 717,125 | Shattuck | Dec. 30, 1902 |
| 775,939 | Saunders | Nov. 29, 1904 |
| 895,664 | McFarland | Aug. 11, 1908 |
| 1,088,207 | Clarke | Feb. 24, 1914 |
| 1,140,684 | Jones | May 25, 1915 |
| 1,221,318 | Hamann | Apr. 3, 1917 |
| 1,237,821 | Rosenthal | Aug. 21, 1917 |
| 1,289,610 | Beard | Dec. 31, 1918 |
| 1,566,962 | Hamann | Dec. 22, 1925 |
| 1,886,148 | Baumann et al. | Nov. 1, 1932 |
| 2,034,724 | Kottman | Mar. 24, 1936 |
| 2,105,640 | Dicke | Jan. 18, 1938 |
| 2,226,919 | Gubelman | Dec. 31, 1940 |
| 2,346,834 | Friden et al. | Apr. 18, 1944 |

FOREIGN PATENTS

| Number | Country | Date |
|---|---|---|
| 9,563 | Great Britain | Apr. 19, 1911 |
| 466,933 | Great Britain | June 8, 1937 |